United States Patent
Garcia

(10) Patent No.: US 11,122,883 B1
(45) Date of Patent: Sep. 21, 2021

(54) CLEANING TOOL WITH ABSORPTIVE RESERVOIR

(71) Applicant: Jay Aurelios Garcia, Carpentersville, IL (US)

(72) Inventor: Jay Aurelios Garcia, Carpentersville, IL (US)

(*) Notice: Subject to any disclaimer, the term of this patent is extended or adjusted under 35 U.S.C. 154(b) by 146 days.

(21) Appl. No.: 16/524,052

(22) Filed: Jul. 27, 2019

Related U.S. Application Data

(63) Continuation-in-part of application No. 16/010,456, filed on Jun. 16, 2018.

(51) Int. Cl.
  *A46B 11/00* (2006.01)
  *A47L 13/34* (2006.01)
  *A47L 13/12* (2006.01)
  *A47J 37/07* (2006.01)

(52) U.S. Cl.
  CPC .......... *A46B 11/0037* (2013.01); *A47L 13/12* (2013.01); *A47L 13/34* (2013.01); *A46B 2200/3093* (2013.01); *A47J 37/0786* (2013.01)

(58) Field of Classification Search
  CPC ............ A46B 11/0037; A46B 11/0055; A46B 2200/3093; A47L 13/12; A47L 13/17; A47L 13/26; A47L 13/34; A47L 17/04; A47L 17/06; A47J 37/0786
  See application file for complete search history.

(56) References Cited

U.S. PATENT DOCUMENTS

| | | |
|---|---|---|
| 2,630,594 A | 2/1947 | Fisher |
| 2,990,564 A | 7/1961 | Sweeney |
| 3,113,335 A | 12/1963 | Baicker |
| 4,944,623 A | 7/1990 | McNeil |
| 5,114,255 A | 5/1992 | Villarreal |
| 6,216,306 B1 | 4/2001 | Esterson |
| 6,276,023 B1 | 8/2001 | Grundy |

(Continued)

FOREIGN PATENT DOCUMENTS

GB    2442351 A * 4/2008 ........... A46B 11/002

OTHER PUBLICATIONS

Safety Data Sheet: Simple Green® Heavy Duty BBQ & Grill Cleaner Version No. 60034-15A Issue Date: Mar. 31, 2015.

(Continued)

*Primary Examiner* — Natasha N Campbell
(74) *Attorney, Agent, or Firm* — Patents and Licensing LLC; Daniel W. Juffernbruch

(57) ABSTRACT

A cleaning tool with a reservoir comprises an elongated handle attached to one end of a cleaning-head hub and an open cell liquid absorptive material, referred to as a squeeze sponge located within the cleaning-head hub. The cleaning tool has a reservoir for holding fluid within the cleaning-head hub and handle removable interchangeable scrubbing components for cleaning grills and griddles. The sponge holds the fluid and dispenses the cleaning liquid drawn from the reservoir to the heat tolerant liquid permeable material used for scrubbing. A mounting plate liquid barrier layer is disposed at a bottom of the reservoir. A plunger plate is disposed above the squeeze sponge and comprises a perimeter seal fitted to mesh against interior sides of the reservoir. A knob is coupled plunger plate above it. A vertical stabilizer rod is disposed within the interior of the reservoir and fitted to the plunger plate.

20 Claims, 26 Drawing Sheets

(56) References Cited

U.S. PATENT DOCUMENTS

| | | |
|---|---|---|
| 6,425,701 B1 | 7/2002 | Jacobs |
| 6,443,646 B1 | 9/2002 | MacDonald |
| D567,511 S | 4/2008 | Borovicka |
| 7,543,352 B2 | 6/2009 | Schaaf |
| 7,632,033 B2 | 12/2009 | Wales |
| 8,099,822 B2 | 1/2012 | Dale |
| 8,672,572 B1 | 3/2014 | Almada |
| 9,101,205 B2 | 8/2015 | Brushtech |
| 9,210,993 B2 | 12/2015 | Gonzalez |
| 9,675,209 B2 | 6/2017 | Roth |
| 10,898,930 B1 | 1/2021 | Garcia |
| 2002/0106478 A1 | 8/2002 | Hayase |
| 2004/0058839 A1 | 3/2004 | Tadrowski |
| 2004/0093679 A1* | 5/2004 | Kukoff .................... A47L 13/16 15/118 |
| 2004/0010571 A1 | 6/2004 | Spelman |
| 2004/0265042 A1 | 12/2004 | Chan et al. |
| 2005/0008675 A1 | 4/2005 | Giovanni |
| 2005/0160544 A1 | 7/2005 | Geller |
| 2005/0207820 A1 | 9/2005 | Franczak |
| 2006/0293205 A1* | 12/2006 | Chung ................. C11D 17/049 510/383 |
| 2007/0270088 A1 | 11/2007 | Greenwood |
| 2008/0244848 A1* | 10/2008 | Firouzman .............. A47L 13/12 15/118 |
| 2009/0301520 A1 | 10/2009 | Schaaf |
| 2010/0006797 A1 | 3/2010 | Hawkins |
| 2010/0056413 A1 | 3/2010 | Harry |
| 2010/0152091 A1 | 6/2010 | Malik |
| 2011/0168206 A1 | 7/2011 | Schaaf |
| 2015/0305585 A1* | 10/2015 | Montefusco ............ A47L 13/16 451/532 |
| 2017/0172290 A1* | 6/2017 | Sampaio ........... B05C 17/00569 |
| 2019/0046005 A1* | 2/2019 | Sullivan ................. A47L 17/08 |

OTHER PUBLICATIONS

Safety Data Sheet: Simple Green® Heavy-Duty BBQ & Grill Cleaner (aerosol) Version No. 60014-15A Issue Date: Mar. 19, 2015.

George Foreman Grill Sponge and package photographs 2017.

How to Clean a George Foreman Grill foremangrillrecipes.com 2017.

Grill Rescue—The World's Best Grill Brush by Grill Rescue—Kickstarter launched Jun.-Jul. 2019 https://www.kickstarter.com/projects/grillrescue/grill-rescue-the-worlds-best-grill-brush website accessed Dec. 9, 2019.

* cited by examiner

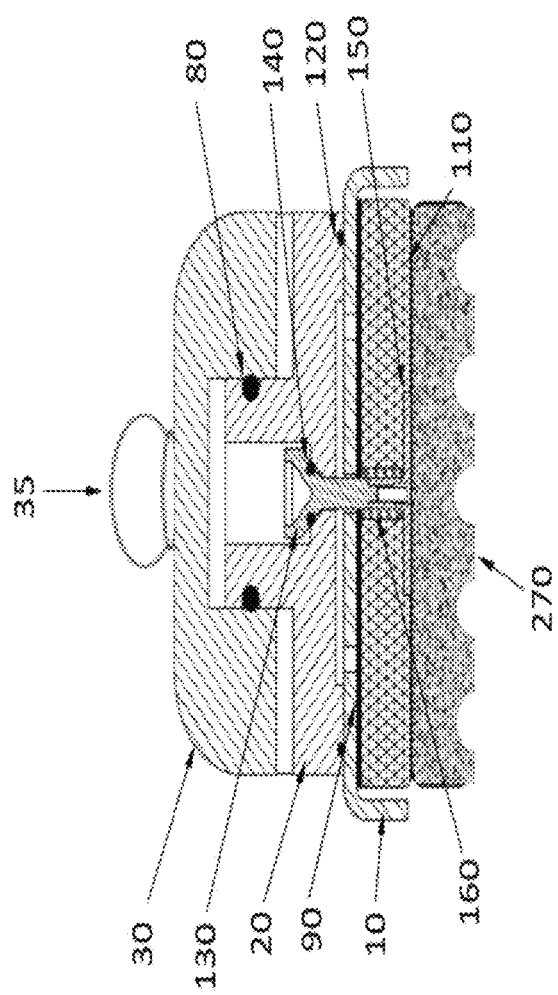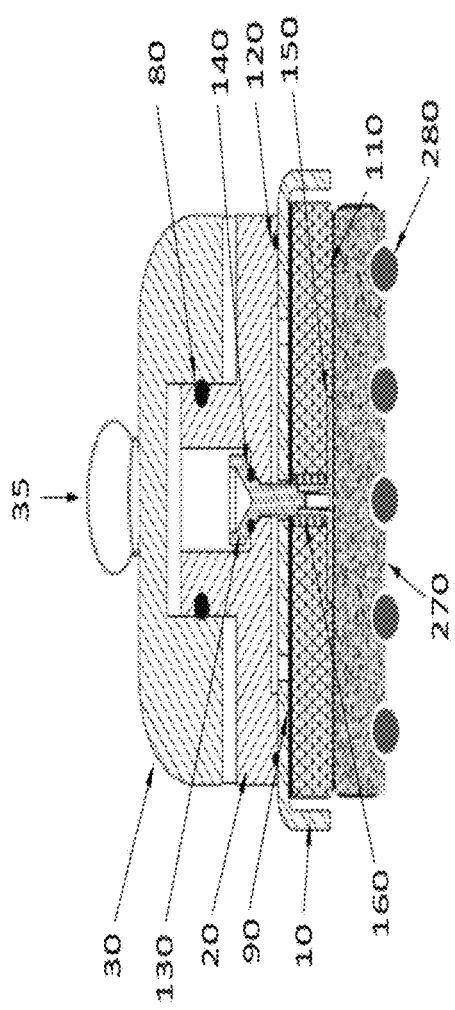

CLEANING TOOL WITH ABSORPTIVE RESERVOIR

BACKGROUND OF THE INVENTION

1. Technical Field

The present inventions relate to cleaning tool and, more particularly, relate to a new cleaning tool for cleaning the grates of a grill while also applying a cleaning fluid.

2. Related Art

Conventional cleaning tools are typically made with metal bristles forming a planar abrasive surface. Conventional cleaning tools have been known to be ineffective in scrubbing a grilling surface while leaving bristles behind.

There exists a need for such a cleaning tool to be operated by hand and formed with a reservoir into which fluid can be properly filled.

There exists a need for such a cleaning tool to be used to regulate the fluid to effectively use the heat from the grill to generate steam for cleaning while grilling.

There exists a need for such a cleaning tool that is designed and formed to contour to the grates to effectively remove the residue and grease from the on top and side surfaces of the grate channels.

There exists a need for such a cleaning tool that uses the hot cooking surface while grilling to use the steam generated from water that easily removes of the residue and sanitizes the grill.

There exists a need for a cleaning tool that can supply a cleaning fluid to the brush when required and in a controlled and measured manner, thereby alleviating wasted fluid nor prematurely running out of fluid in the reservoir.

SUMMARY OF THE INVENTION

A cleaning tool with a reservoir constructed of: a brush with an elongated handle which is secured to the reservoir for scrubbing with the heat tolerant liquid permeable material when wet from the cleaning fluid dispensed from the reservoir; a heat tolerant liquid permeable material on an outside surface of the tool and secured beneath the reservoir to receive the cleaning liquid, the heat tolerant liquid permeable material capable of withstanding a temperature above 212 F (100 C); a knob affixed to the center of the brush, wherein the handle is a knob; a brush reservoir incorporated into the brush head and handle, allowing fluid to enter the cavity of the brush reservoir where the absorptive material intermediately disposed between the reservoir and the heat tolerant liquid permeable material to hold and transport the cleaning liquid from the reservoir to the heat tolerant liquid permeable material. The intermediate material in embodiments can be a compressible material. When the compressible material is a sponge, it can be referred to as a squeeze sponge. The compressible material or squeeze sponge provides a supply of fluid and wicks fluid from the reservoir when a user applies a downward force on the handle or the knob. The cleaning tool is manually operated with an integrated reservoir and uses the heat of the grill while grilling to generate steam from water in a way that eases the removal of residue from the cooking surface of the grill.

The disclosed invention may be embodied as a cleaning tool consisting of: a brush tube-handle reservoir attached to the end of the brush head; a knob affixed to the center of the brush head; a fluid reservoir located within the tube-handle and cavity of the brush head wherein the cleaning liquid held in the reservoir comprises a natural food grade cleaning acidic solution; a squeeze sponge located inside the cavity of the brush head; or a brush head without a handle member that extends outside the circumference of a removable tube-handle reservoir; a reservoir cap attached to the end of the brush handle; or a reservoir cap attached to the end of brush head opening where fluid enters the cavity, and a valve and compression spring mechanism located in the interior cavity of the brush head. The brush head is configured with removable scrubbing brushes includes: a heat tolerant wire comprises a plurality of rows of wire brushes with the rows arranged in parallel and spaced distances conforming to a cooking grate; and heat tolerant liquid permeable sponge comprises a closed cell sponge wherein the closed cell sponge liquid permeable channels therein for liquid permeability and comprises a grooved sponge on a lower side with rows of grooves arranged in parallel and spaced distances conforming to a cooking grate. Furthermore, the disclosed invention relates to a cleaning tool that is configured to synchronize a group of integrated components of a reservoir in harmony during operation: tube-handle, brush head, sponge and valve mechanism. As fluid enters the cavity of the of brush head, fluid is retained within the space of the cavity; and fluid is released after the valve is opened and absorbed by a squeeze sponge. The reservoir and squeeze sponge provide a supply of fluid and releases fluid by a user applying downward force from the tube-handle reservoir or the knob. The valve remains closed and is activated during operation by pushing down on the knob or tube-handle reservoir which pre-distributes the fluid to the sponge and expels fluid drawn from the reservoir downstream to scrubbing brushes.

The disclosed invention may be embodied as a cleaning tool consisting of: a handle reservoir attached to the end of the cleaning-head hub; a knob coupled to the plunger plate; a fluid reservoir located within the interior volume of the handle and the cleaning-head hub wherein the cleaning liquid held in the reservoir comprises a natural food grade cleaning acidic solution; a squeeze sponge located inside the cleaning-head hub; a reservoir cap attached to the end of the brush handle.

As fluid enters the reservoir of the cleaning-head hub, fluid is retained by a squeeze sponge within the reservoir. The reservoir and squeeze sponge provide a supply of fluid and releases fluid by a user applying a downward force on the plunger knob which compresses the squeeze sponge to dispense fluid drawn from the reservoir downstream onto the scrubbing components and grill.

BRIEF DESCRIPTION OF THE DRAWINGS

The present disclosure will be better understood by those skilled in the pertinent art by referencing the accompanying drawings that are representative of a cleaning tool embodiment in accordance with the invention. The components in the drawings clearly illustrate the principles of the invention and are not necessarily displayed to scale. The corresponding components of the embodiment views are numerically numbered.

FIG. 8 is a front view of the disclosed cleaning tool from FIG. 1 showing the side view of aluminum oxide sponge;

FIG. 9 is a front view of the disclosed cleaning tool from FIG. 1 showing the side view of aluminum oxide sponge pressed against the grill grates;

DETAILED DESCRIPTION OF THE PREFERRED EMBODIMENTS

Figure 1:
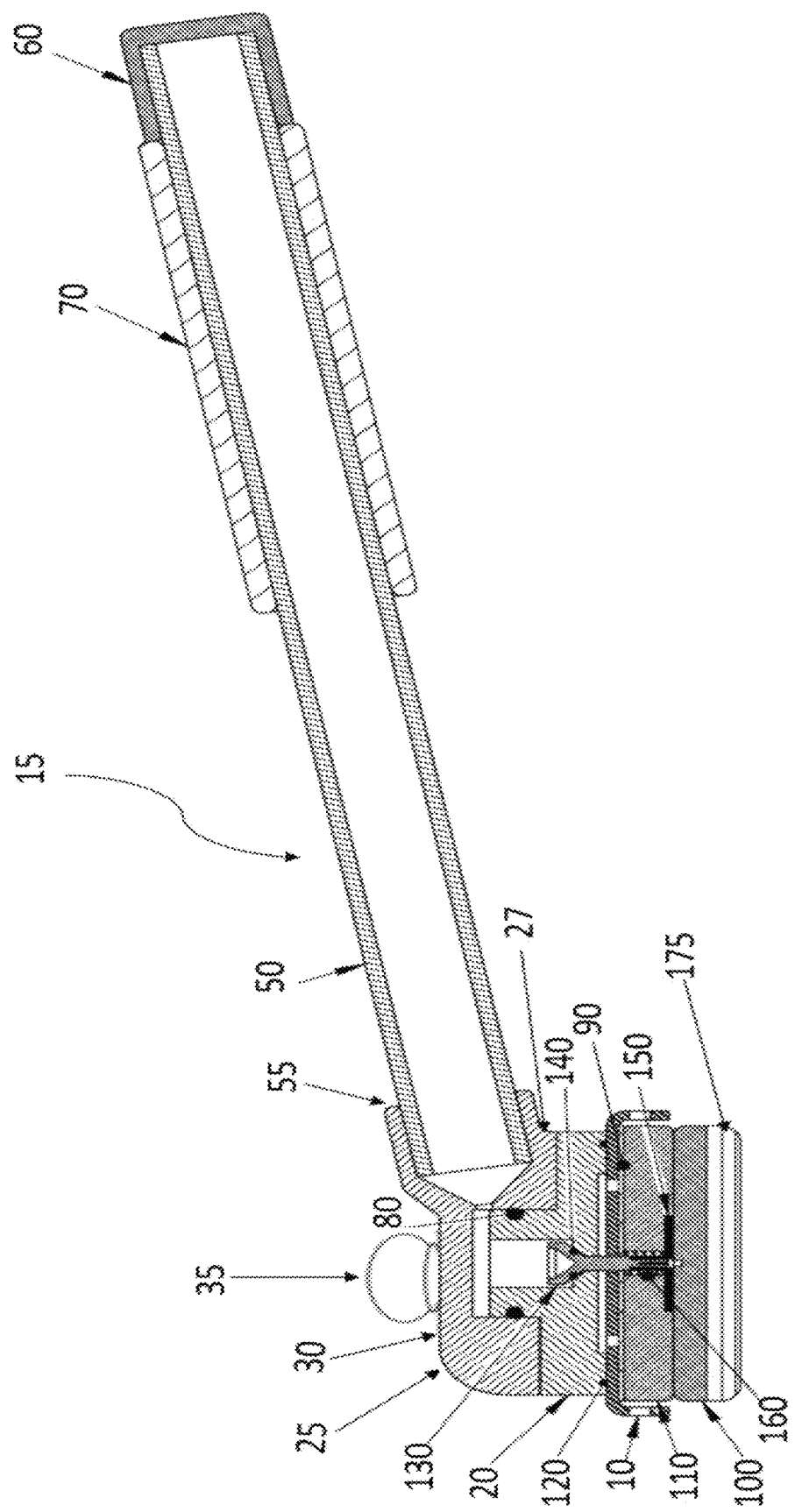
FIG. 1 is a side cross-sectional view of one embodiment of the disclosed cleaning tool.
Figure 2:
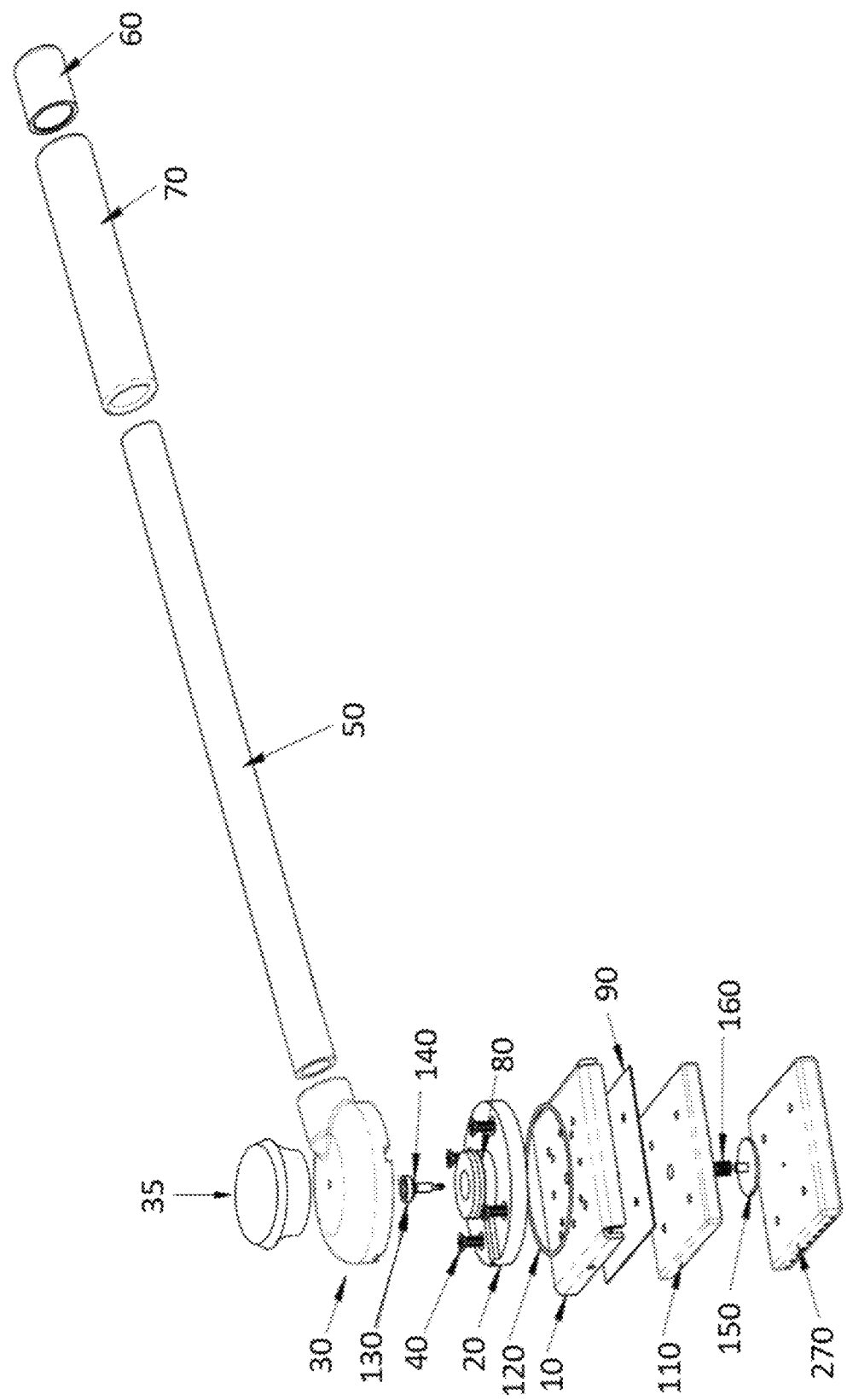
FIG. 2 is an exploded view of the disclosed cleaning tool from FIG. 1 showing the isometric view of the aluminum oxide sponge.
Figure 3:
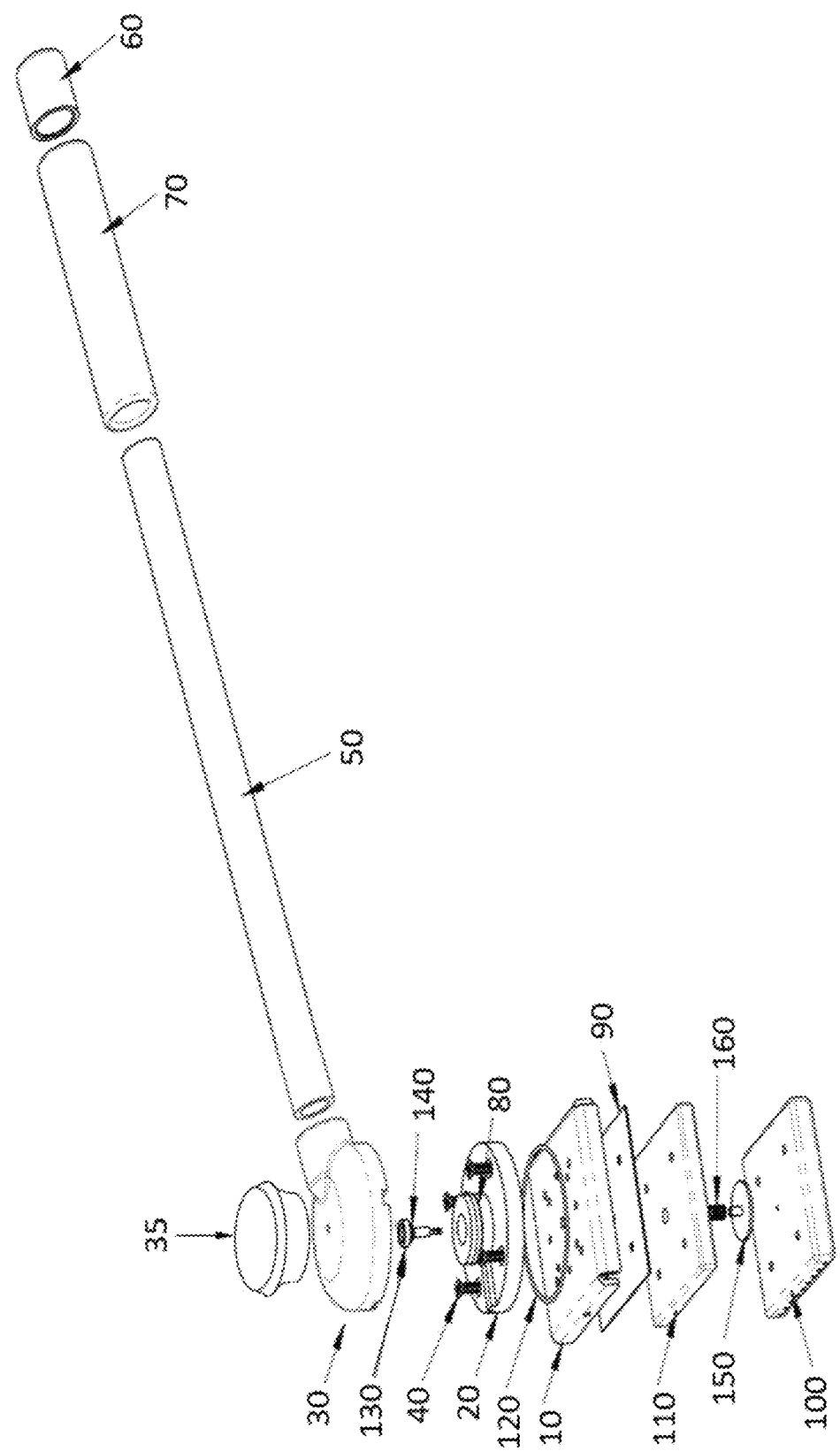
FIG. 3 is an exploded view of the disclosed cleaning tool from FIG. 1 showing the isometric view of the silicone sponge.
Figure 4:
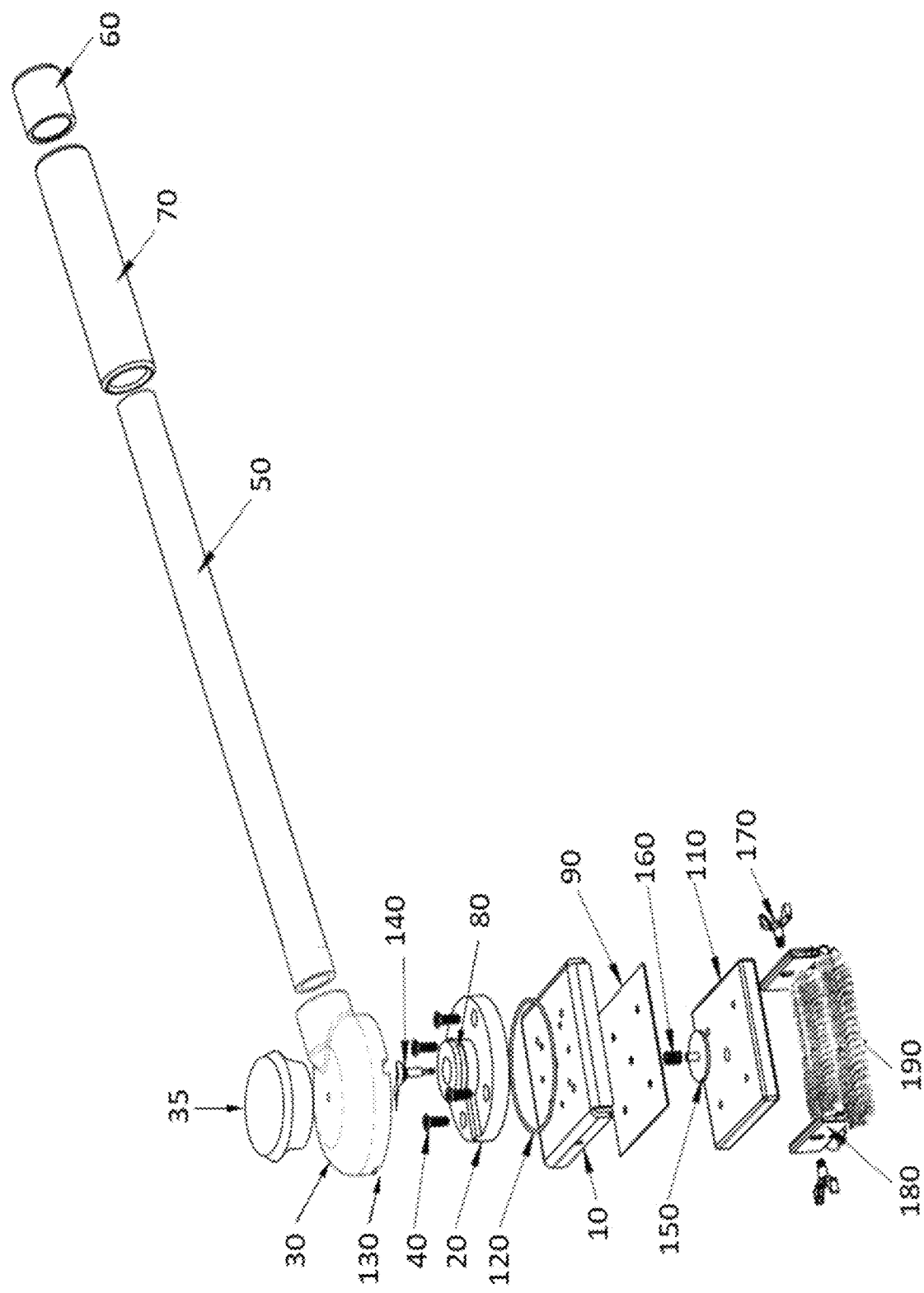
FIG. 4 is an exploded view of the disclosed cleaning tool from FIG. 1 showing the isometric view of the bristle brushes.
Figure 5:
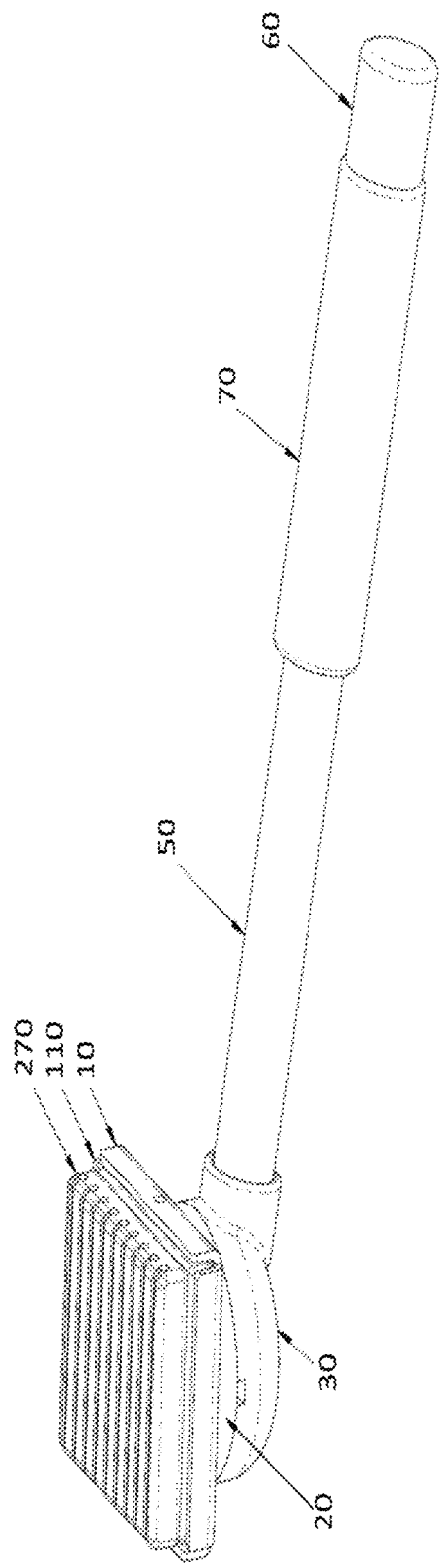
FIG. 5 is a bottom isometric view of the disclosed cleaning tool from FIG. 1 showing the isometric view of silicone sponge.
Figure 6:
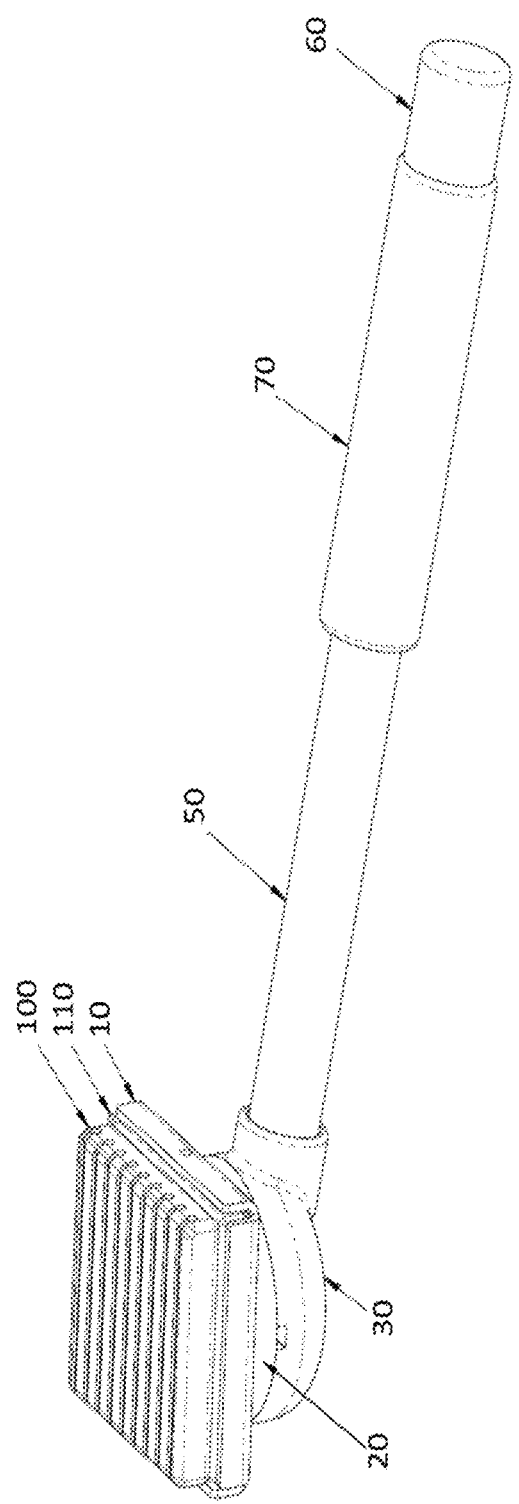
FIG. 6 is a bottom isometric view of a brush head showing the isometric view of aluminum oxide sponge.
Figure 7:
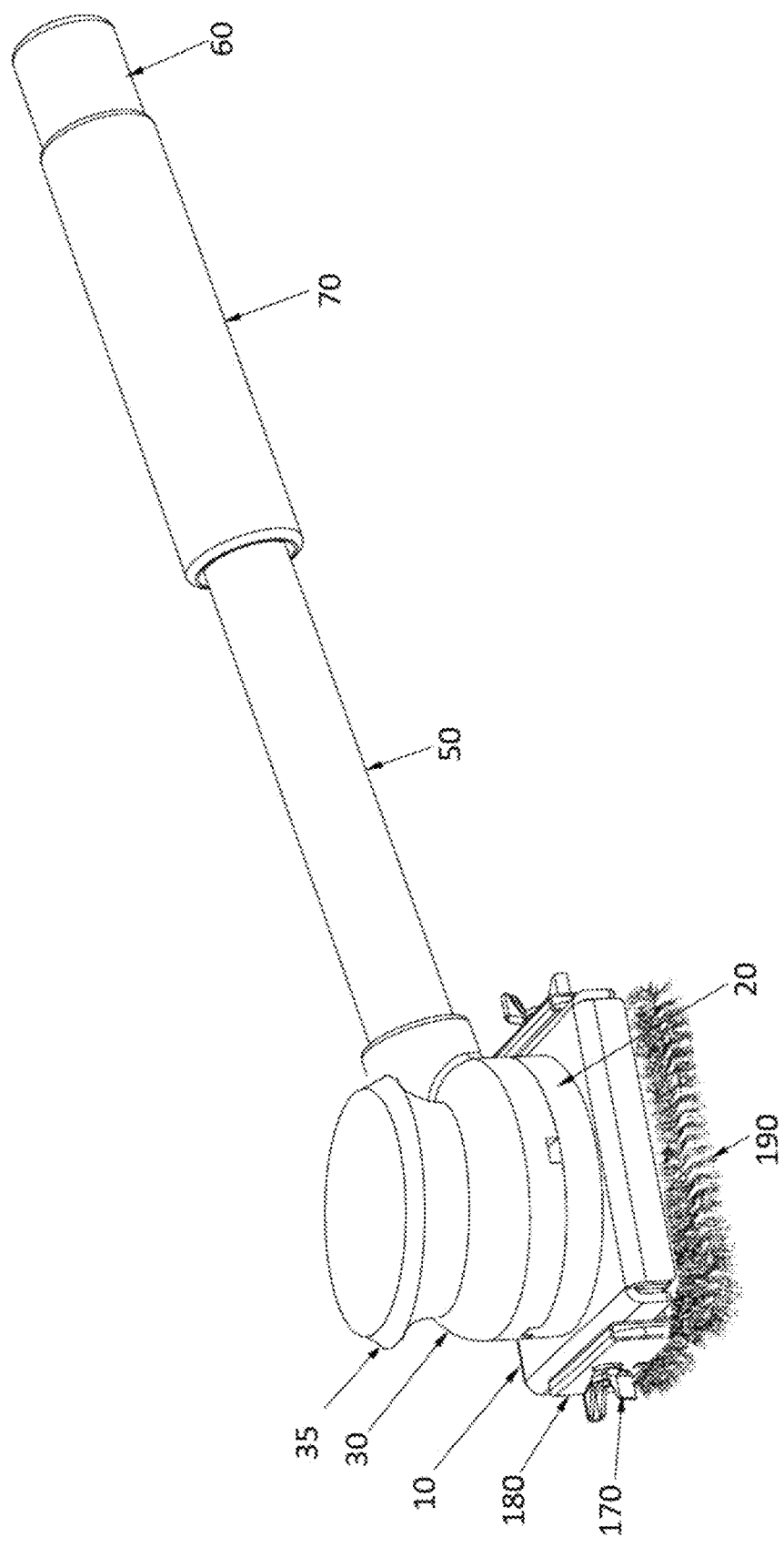
FIG. 7 is an isometric side view of the disclosed cleaning tool from FIG. 1 showing the side view of bristle brushes.
Figure 10:
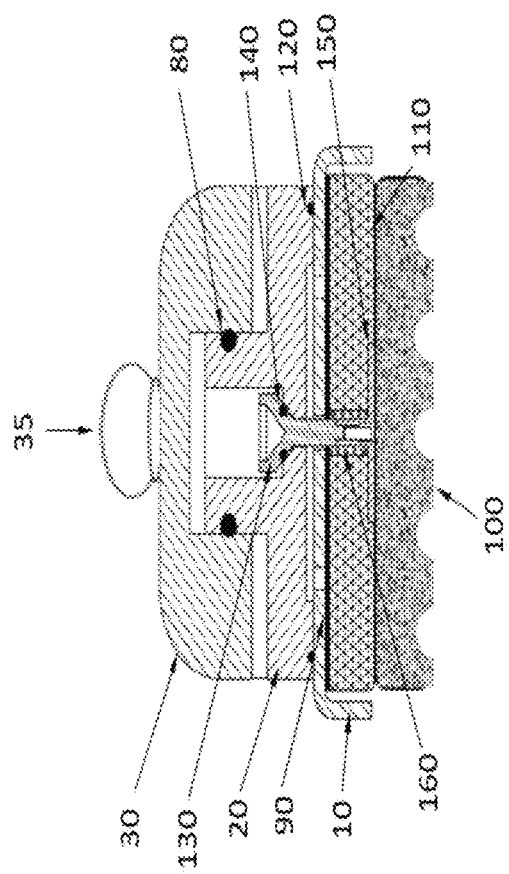
FIG. 10 is a front view of a head brush displaying the front side view of silicone sponge.
Figure 11:
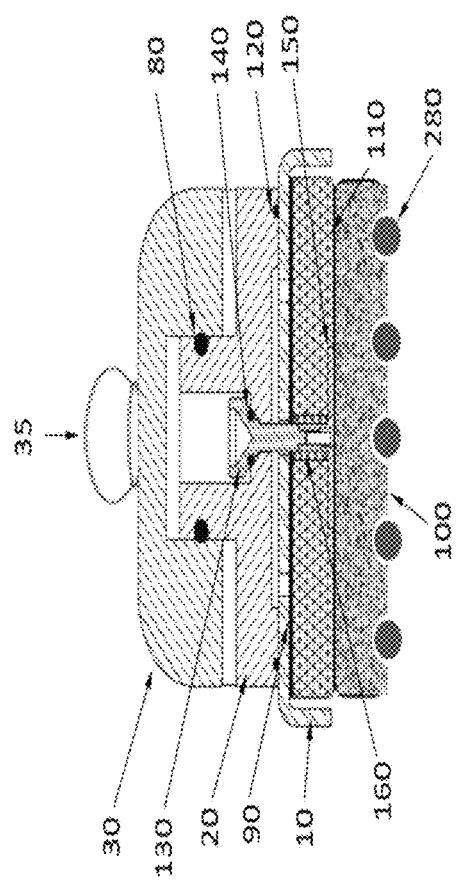
FIG. 11 is a front view of a head brush displaying the front side view of silicone sponge pressed against the grill grates.
Figure 12:
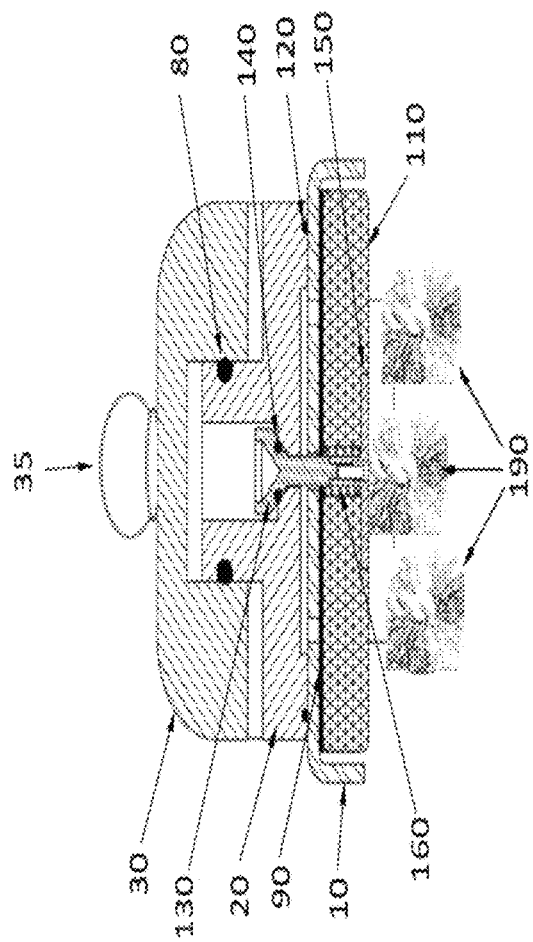
FIG. 12 is a front view of a head brush displaying the front side view of bristle brushes.
Figure 13:
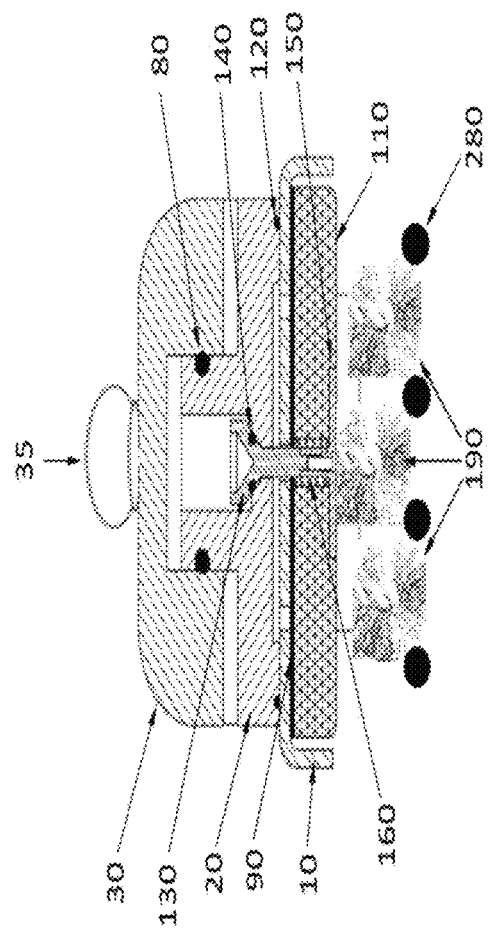
FIG. 13 is a front view of a head brush displaying the front side view of bristle brushes pressed against the grill grates.

The disclosed inventions relate to a cleaning tool used for cleaning barbecue grill grates as per the invention shown in FIGS. 1 to 17. Such illustrations are meant to show the innovative ways of cleaning barbecue grill grates and are not intended to be restrictive to the invention.

Referring to FIGS. 1 to 17, cleaning tool 15 has a brush head 25, a tube-handle reservoir 50, brush head reservoir 55, a knob 35 affixed to the center of the brush head 25; handle grip 70 and a reservoir cap 60. The tube-handle reservoir 50 and scrubbing brush element are formed integrally within brush head 25. The tube-handle reservoir 50 has an elongate shape for grasping and is attached to the outer circumference projecting the end of the brush head 25 and contains an opening through which the fluid flows from the handle; and its detachable at the end of brush head 25 to form a cleaning tool 15 with no tube-handle reservoir 50 as shown in FIG. 15. The reservoir cap is attached to the end tube-handle reservoir 50; or the reservoir cap is attached to the end of brush head opening where fluid enters the brush head reservoir 55 as shown in shown in FIG. 15. During operation, the tube-handle reservoir 50 distributes fluid to a squeeze sponge which releases the fluid downstream to the scrubbing brushes 175. The scrubbing brush is attached to the bottom of the head brush 25 and is adoptable to different forms of scrubbing brushes 175 which includes abrasive bristle wires and abrasive scrubbing sponges.

The squeeze sponge 110 in various embodiments can be any highly absorptive compressible material such as a sponge. The squeeze sponge 110 is formed as part of the sponge assembly that includes the interfacing substrate 90, mounting plate 10 and is staggered below and attached to the mounting hub 20. The sponge assembly can be separated from upper hand hub 30 and handle assembly for: cleaning purposes and replacing sponge assembly by turning sponge assembly 90 degrees. The handle grip 70 can be inserted onto tube-handle reservoir 50 if the handle grip 70 is made of foam, or the handle grip 70 can be molded in place. The tube-handle reservoir 50 is attachable to the brush head 25 via threaded mating surfaces or welded, glued or press fit. The tube-handle reservoir 50 and brush head reservoir 55 is adapted to be filled with a liquid or water mixed with a powered citrus acid cleanser. The tube-handle reservoir 50 can be affixed to hand hub 30 through: ultrasonic welding, screwing in place, press-fit or gluing in place. An O-ring 80 both provides a seal between hand hub 30 and mounting hub 20 and holds mounting hub 20 into hand hub 30 by using a slight indentation on the inside wall of hand hub 30. Additional constraint can come from adding removable snap features as well. Mounting hub 20 is affixed to mounting plate 10 either by screws, rivet 40 or heat-staking; and mounting hub 20 is sealed to mounting plate 10 with either a separate or molded in O-ring 120.

The brush head 25 is constructed with a valve 130, compression spring 160 and lower valve actuator 150 mechanism. Plastic lower valve actuator 150 is snapped onto plastic valve 130 during assembly. Valve 130 is integrated with the compression spring 160 and lower valve actuator 150 within the brush head reservoir 55. When not activated, valve 130 is sealed to mounting hub 20 with either a separate or molded in O-ring 140. Compression spring 160 is captured between lower valve actuator 150 and mounting plate 10 and provides a resistance force required to hold valve 130 closed. When the brush head 25 is pushed down manually the compression spring 160 exerts a linear resistance force on the valve stem which triggers the valve actuator 150 to open the valve 130. When the valve 130 is at rest the spring 160 exerts a resistance force on the valve actuator 150 to close the valve 130. The compression spring 160 exerts a bias force on the valve 130 to move vertically upward to open the valve 130 and vertically downward to close valve 130.

The brush head 25 is assembled with a valve 130 and compression spring 160 used to regulate the flow of fluid within the orifices communicated between the integrated reservoir, intermediate sponge layer 110 and valve mechanism. Fluid is regulated by the amount of pressure exerted on the valve 130 mechanism. The valve 130 remains closed and is activated during operation by pushing down on the knob 35 or tube-handle reservoir 50 which pre-distributes the fluid to the squeeze sponge 110 which expels fluid drawn from the reservoir downstream and disbursed onto the scrubbing brushes 175.

Holding the knob 35 while scrubbing the grate rods 280 gives the user the ability to press greater force on the cleaning tool 15. When the brush head 25 is pressed down from the knob 25 or tube-handle reservoir 50 during operation, cleaning tool 15 flexes and compresses 68, the squeeze sponge 110, compression spring 160 and valve 130. The compression spring 160 bias forces the valve to open during operation and close when the valve is at rest. Fluid gradually stops flowing from the lower volume of cavity 27 as the linear bias force exerted on the hand hub 30 is relieved and brush head 25 decompresses the squeeze sponge 110 and compression spring 160 retracts the valve actuator 150 to close the valve 130. The downward force on the head brush 25 lifts the valve 130 to allow fluid to exit.

The brush head 5 is formed with a detachable squeeze sponge 110 producing a reservoir into which a liquid cleanser or water can be absorbed. The brush head reservoir 55 and squeeze sponge 110 are integrated components of a fluid reservoir and the squeeze sponge 110 is adopted as the intermediate layer to provide a supply of fluid and wicks fluid quickly by a user applying force from the tube-handle reservoir 50 or on the knob 35 located in the center of the brush-head. The squeeze sponge 110 can be affixed to mounting plate 10 through gluing or in-molding directly to mounting plate 10 or use of interfacing substrate 90 if required. The squeeze sponge 110 is made of an open cell polyvinyl alcohol material and is situated inside the cavity 27 of the brush-head 25 attached to the mounting plate 10 and interfacing substrate 90; and interfaces with the scrubbing brushes 175 located at the bottom end of the brush head. An open cell polyvinyl alcohol material is a PVA material.

The scrubbing brushes 175 are designed and formed to wrap around the accessible perimeter of grate rods 280 to effectively remove debris and baked-on food deposits. The cleaning tool 25 provides independent interchangeable brushes and are adoptable to different forms of scrubbing brushes 175 which include wire bristle brushes 190, silicone sponge 100 or an aluminum oxide sponge 270 as shown. Also, an alternative, the sponge can be made of a nanofiber. The ceramic nanofiber can be capable of withstanding up to 1400 F. The aluminum oxide sponge 270 can be capable of withstanding up to 5391 F (2977 C). The scrubbing brushes 175 are molded to easily attach and be removed from the head brush 25. Whatever material is chosen for the temperature liquid permeable material, it must be capable of withstanding a temperature above 212 F (100 C). The silicone sponge 100 or aluminum oxide sponge 270 are made of an impermeable material and pinholes are bored through to allow fluid to transport from the reservoir components downstream to the bottom layer scrubbing surface area during operation. The cleaning tool 15 can use the heat or the hot surface of the grill to generate steam once the fluid is released from the squeeze sponge 110 while grilling in a way that eases the removal of the residue and sanitizes the grill.

Referring to FIGS. 4 and 7 and FIGS. 12 to 13 the bristle brushes 190 are welded to brush mounting brackets 180 and is made of a heat tolerant wire which includes a plurality of rows of wire brushes with the rows arranged in parallel and spaced distances conforming to a cooking grate. The bristle brushes consist of three woven stainless-steel spiraled wire bristle formed in a triangular geometric shape and affixed to mounting plate 10 and fastened by the threaded mating surfaces of the wing nuts 170 and brush mounting brackets 180. Bristle brushes 190 and brush mounting bracket 180 sub-assembly are affixed to mounting plate 10 with two (or more) screws or wing nuts 170. A shoulder or spacer on the wing nut or screw 170, prevents screws or wing nuts 170 from clamping onto brush mounting brackets 180 and allows some limited vertical movement as well as side to side movement through the use of slots in the brush mounting brackets 180. This freedom of limited movement enables the brush to push against the lower valve actuator 150 and open the valve 130 thus applying more fluid as needed. Staggered placement of bristle brushes 190 allows cleaning with each stroke of the brush through added contact with both the top and sides of the grate rods 280. The wire bristles are woven around a metal rod, producing spiraled shaped bristles arising in 360 degrees configuration. The spiraled wire bristle brushes 190 have a triangular design to rotate around the grate rods 280 and provides deep cleaning under hot flames. The wire bristle brushes 190 can slightly shift upward and downward through the use of spacers on the nut or screw attachments 170W which pass through slots in the brush mounting bracket 180 in which the spacers ride in, allows the required movement to compress or decompress the squeezable sponge 110 and compressible spring 160 thus triggering the opening and closing the valve 130 within the cavity 27 of brush head 25.

Referring to FIGS. 2, 3, 5 and 6 and FIGS. 8 to 11 the cleaning tool includes a silicone sponge 100 or aluminum oxide sponge 270. Grooves on the underside of either silicone sponge 100, or aluminum oxide sponge 270 allows cleaning with each stroke of the brush through added contact with both the top and sides of the grate 280. The grooved surface silicone sponge 100 or aluminum oxide sponge 270. The silicone sponge 100 is bristle-free and safest way to rinse and clean the grate 280, avoiding the danger of metal bristles that could fall out and get into the food. The silicone sponge 100 will not cause scratches on the grill or lift the cure from the grate; and prevent small, sharp bristles that can break off during cleaning and get stuck to the grill's cooking surface.

Referring to FIGS. 3, 6, 10 and 11, respectively the cleaning tool includes a silicone sponge 100, wherein the heat tolerant liquid permeable sponge comprises a closed cell sponge; wherein each of the grooves in the grooved sponge comprise wrap around grooves for wrapping onto a top and sides of a corresponding bar of the cooking grate 280; and wherein the closed cell sponge includes liquid permeable channels therein for liquid permeability. The grooved shape sponge is designed to promote effective rinsing as well as removal of remaining deposits from grate 280. Silicone sponge 100 is non-water absorbent, porous and bacteria and mildew resistant. Silicone can be used safely on hot grill tops without scratching or lifting the grill cure and can withstand temperature ranges: from −60° C. to 230° C. (−76° F. to 446° F.). Silicone sponge 100 can easily break up and lifts away grease and surface debris deposited on grill grates 280.

Referring to FIGS. 2, 5, 8 and 9, respectively the cleaning tool includes an aluminum oxide sponge 270 and the aluminum oxide is coated over an impermeable sponge. Aluminum oxide sponge 270 a closed cell sponge; wherein each of the grooves in the grooved sponge comprise wrap around grooves for wrapping onto a top and sides of a corresponding bar of the cooking grate 280; and wherein the closed cell sponge include liquid permeable channels therein for liquid permeability. The grooved shape sponge is designed to promote effective rinsing as well as removal of remaining deposits on grate 280. The aluminum oxide sponge 270 could be used when the grill is cold or hot and is insoluble in a water boiling point of: 5391° F. (2977° C.).

Figure 14:
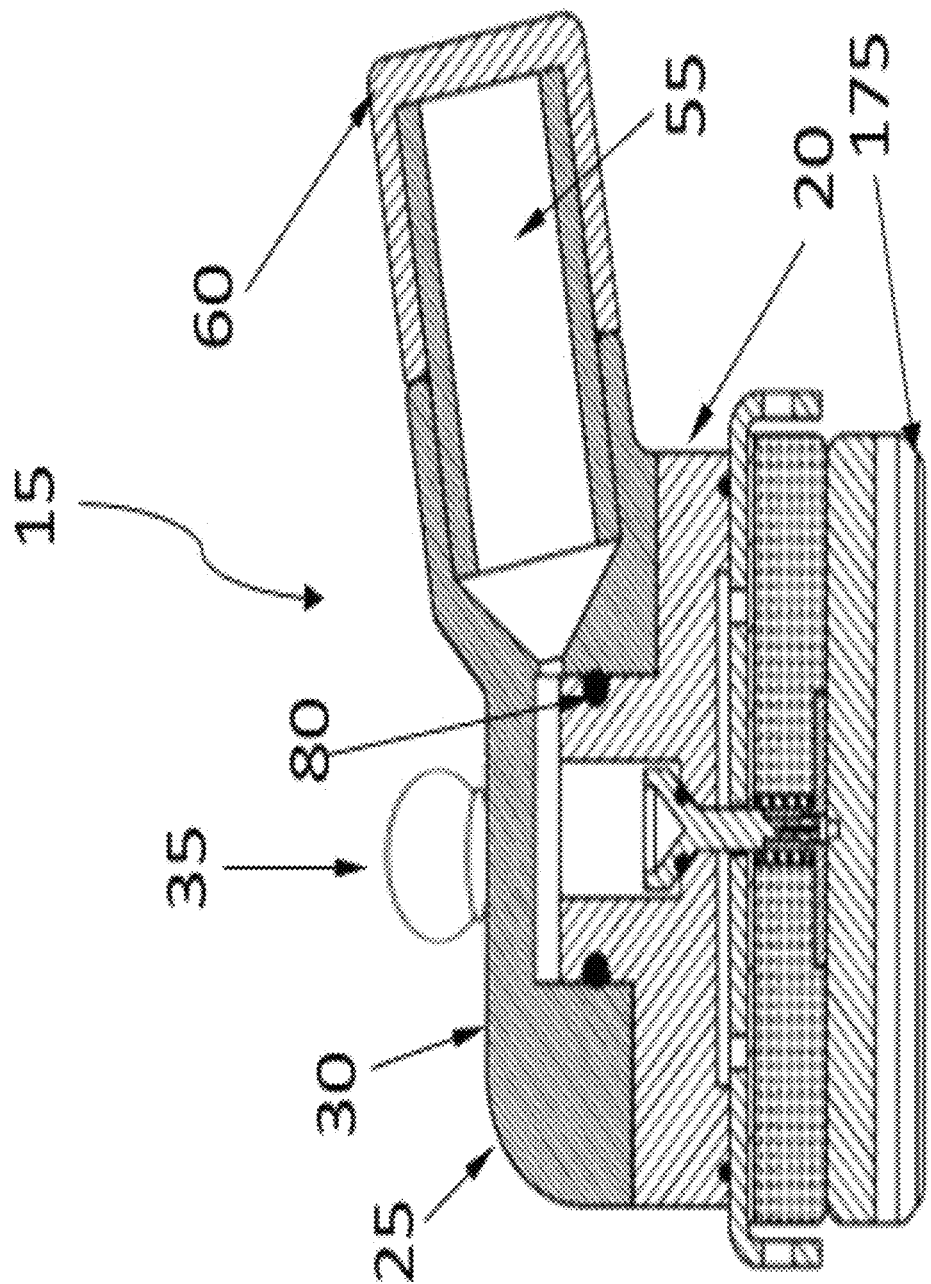
FIG. 14 is a side cross-sectional view of another embodiment of the disclosed cleaning tool from FIG. 1.
Figure 15:
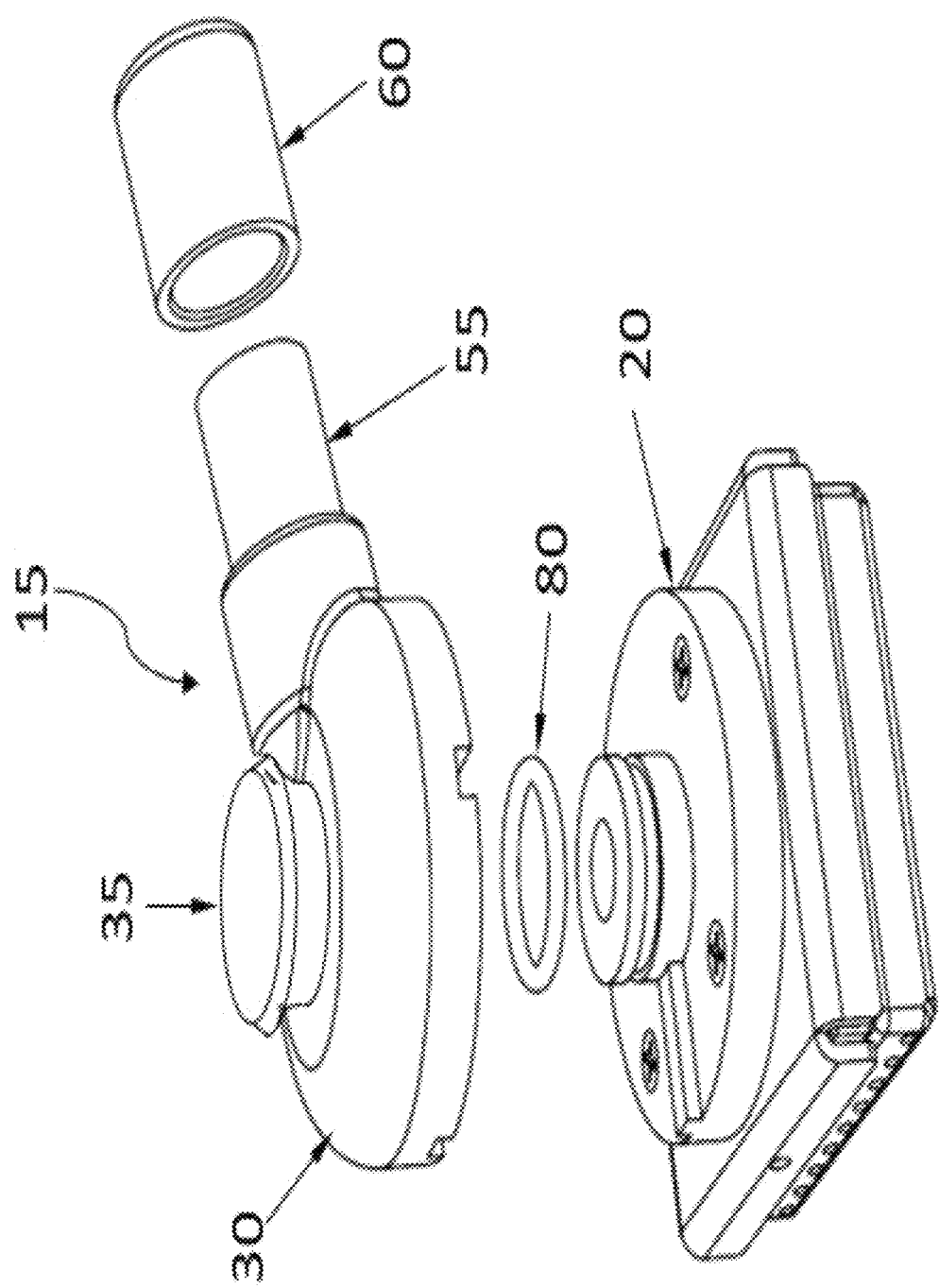
FIG. 15 is an exploded view of the disclosed cleaning tool from FIG. 14.

FIGS. 14 and 15 shows an alternate cleaning tool 15, as referenced in FIG. 1 above and does not include a handle member that extends from the end of the brush where fluid enters the reservoir. A fluid reservoir 55 is located within cavity 27 of the brush head 25 and a reservoir cap 60 is attached to the end of brush head 25 opening. The brush head is configured with a valve mechanism used to regulate the flow of fluid within the orifices communicated between the integrated reservoir and intermediate sponge layer 110. The cleaning tool is designed to be used on cool surfaces and provides interchangeable scrubbing brushes 170 suited for grate cleaning for different types of surfaces. The application of this cleaning tool is not as effective as using the heating means to clean the grill.

Figure 16:
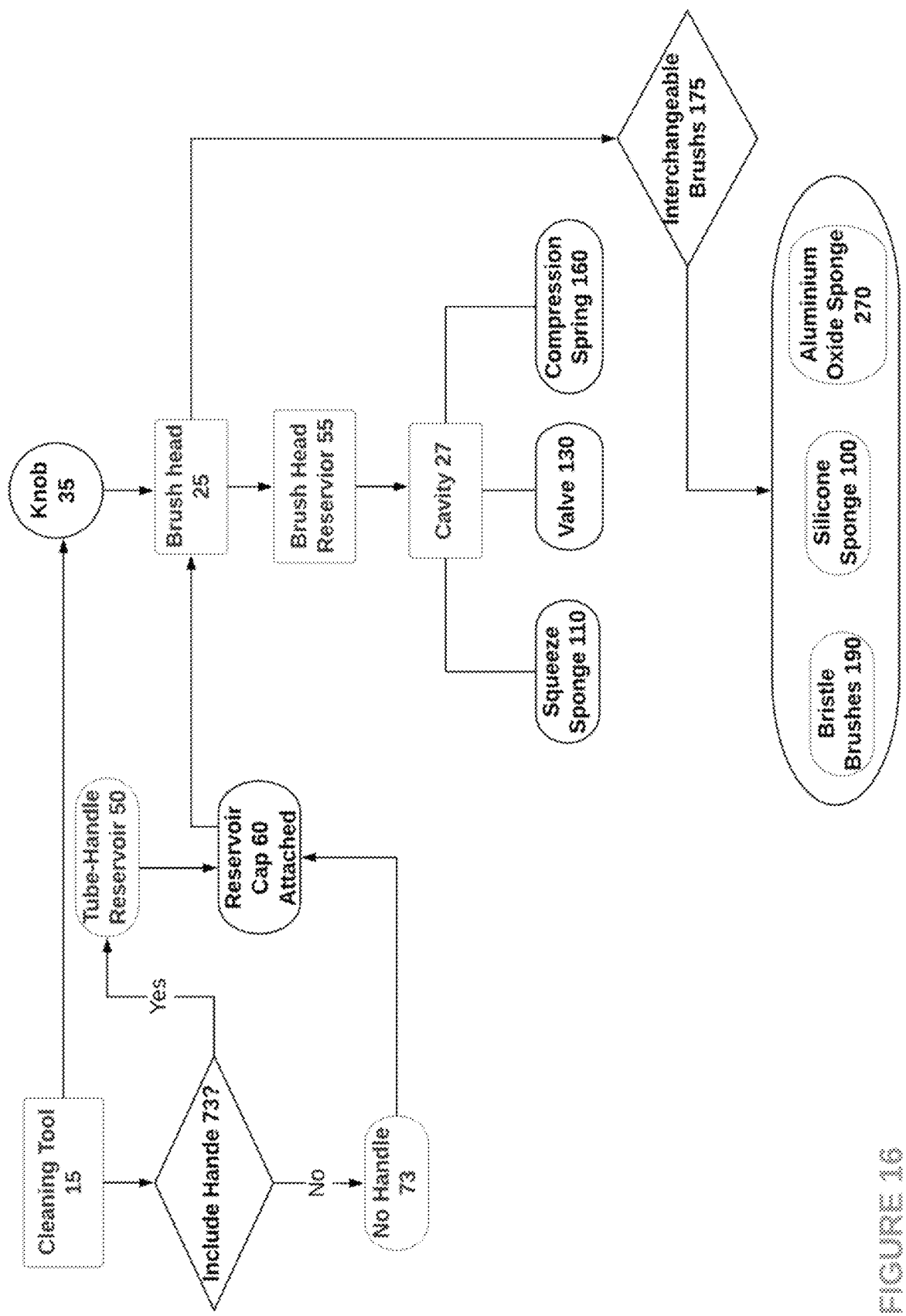
FIG. 16 is a flowchart illustrating a method of a manually cleaning grills and using a cleaning tool disclosed in FIG. 1 to FIG. 15.

Referring to FIG. 16, a method for manually cleaning grills using a cleaning tool 15 is illustrated in a flowchart. The method includes: a cleaning tool 15, as illustrated in FIGS. 1 to 15, with an elongated handle integrated with a tube-handle reservoir 50 or a brush head 25 with a removable handle 73; a squeeze sponge 110; a reservoir cap 60 attached to close the opening where fluid enters the brush head reservoir 55 and resides in the cavity 27; a valve 130 and compression spring 160 mechanism and removable scrubbing brushes 175.

Figure 17:
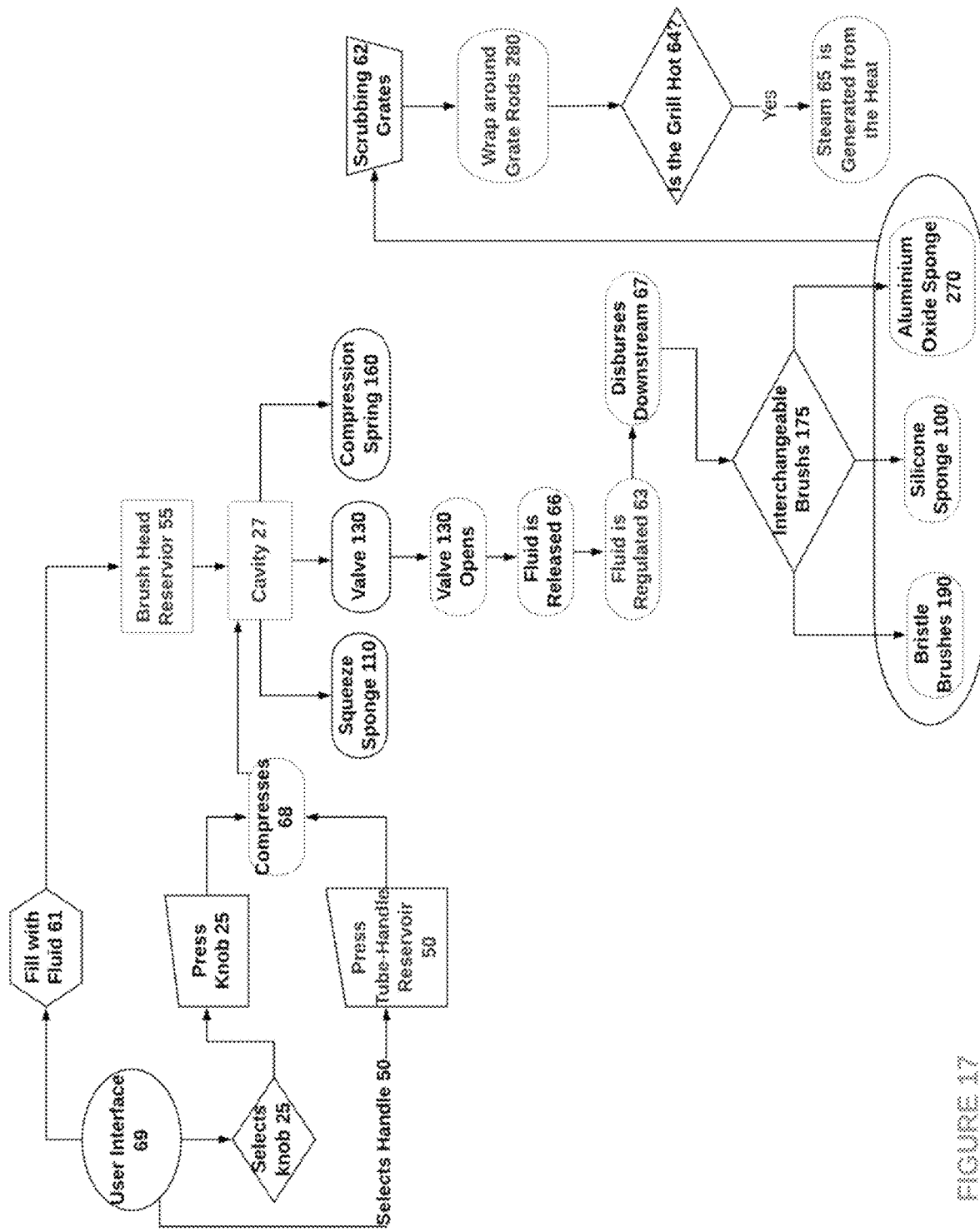
FIG. 17 is a flowchart is a continuation of FIG. 16 illustrating a user interface applying a method for manually cleaning grills and using a cleaning disclosed in FIG. 1 and FIG. 14.
Figure 18:
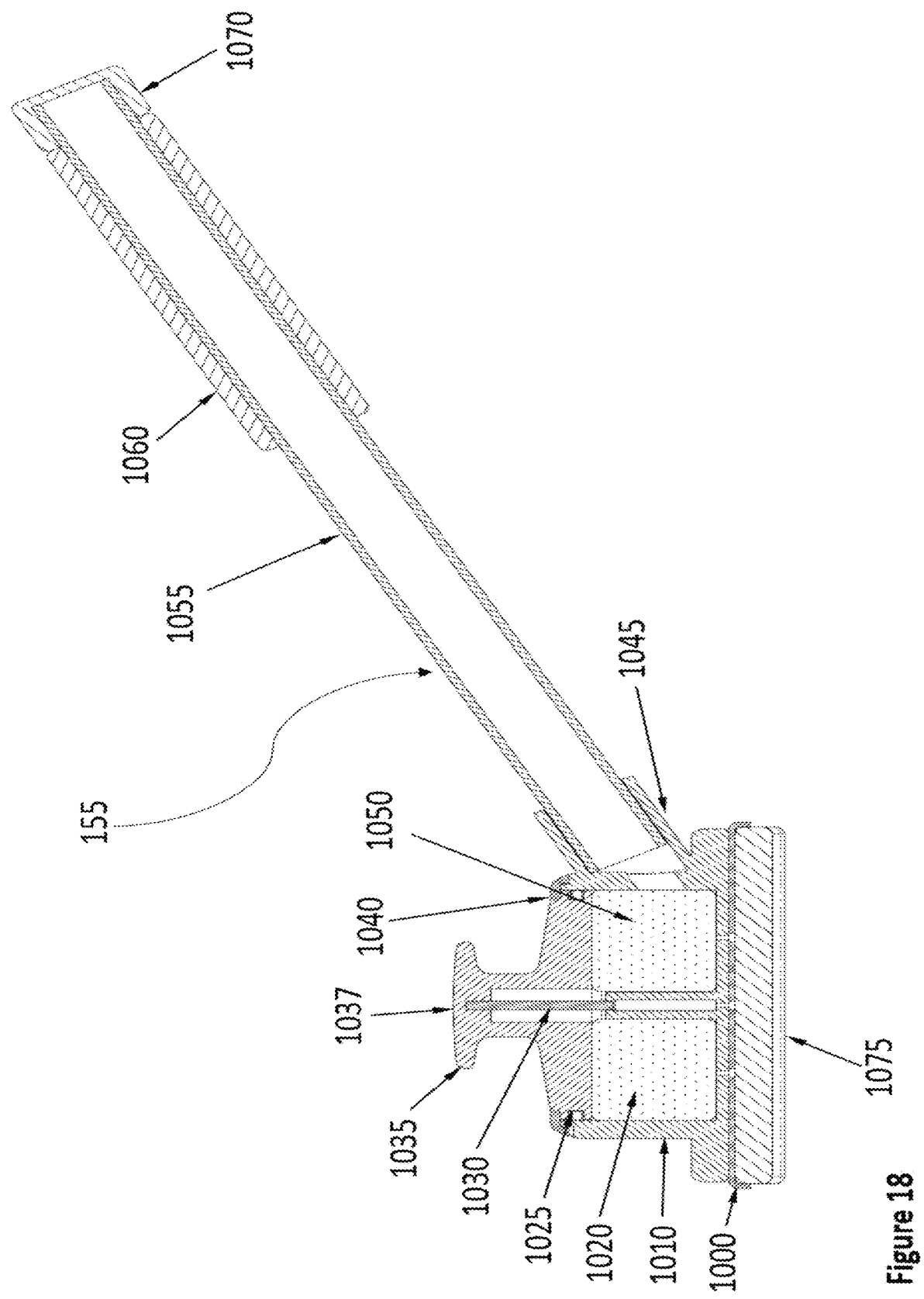
FIG. 18 is a side cross-sectional view of one embodiment of the disclosed cleaning tool.
Figure 19:
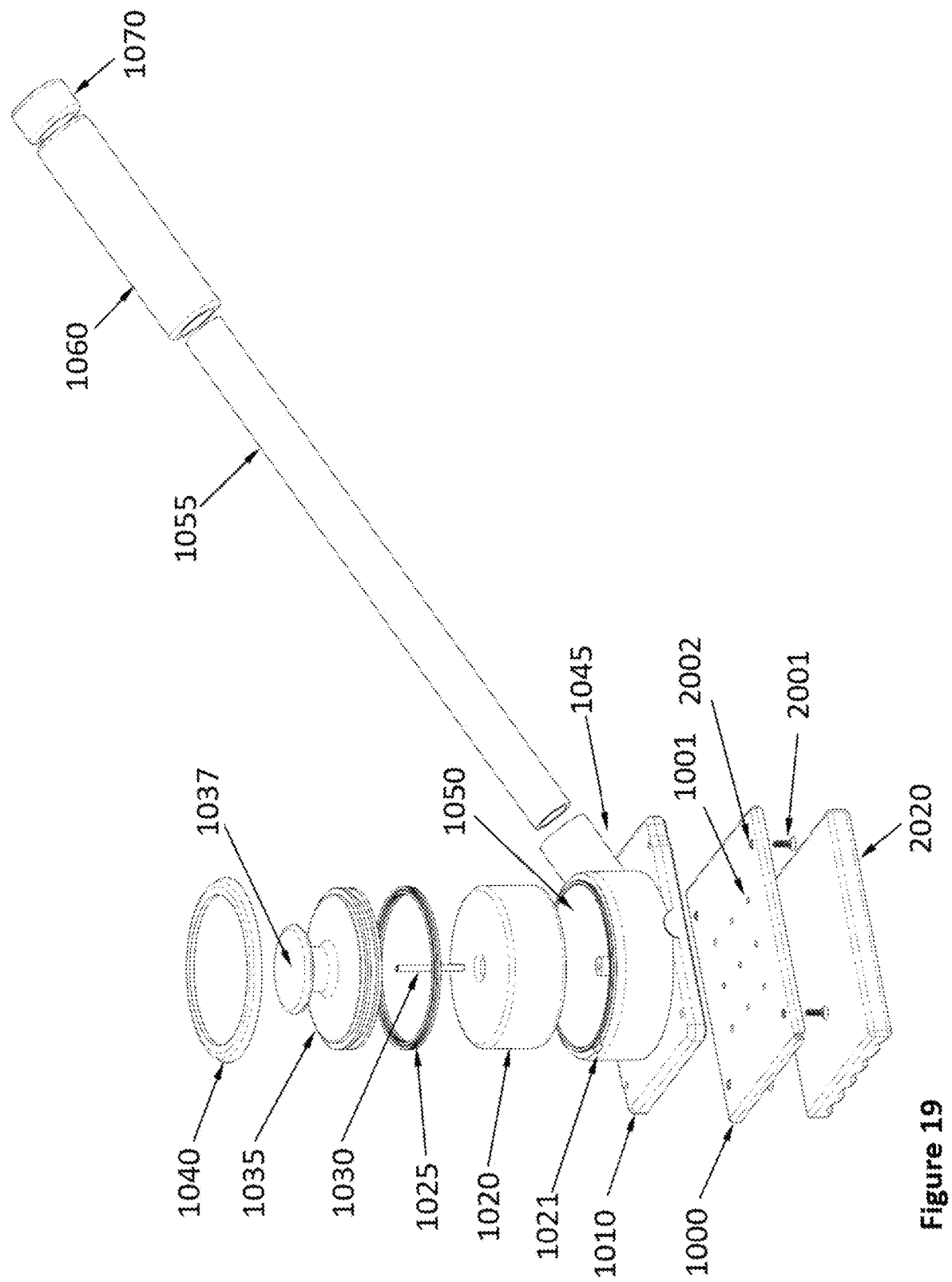
FIG. 19 is an exploded view of the disclosed cleaning tool from FIG. 18, showing the side view of the aluminum oxide sponge.
Figure 20:
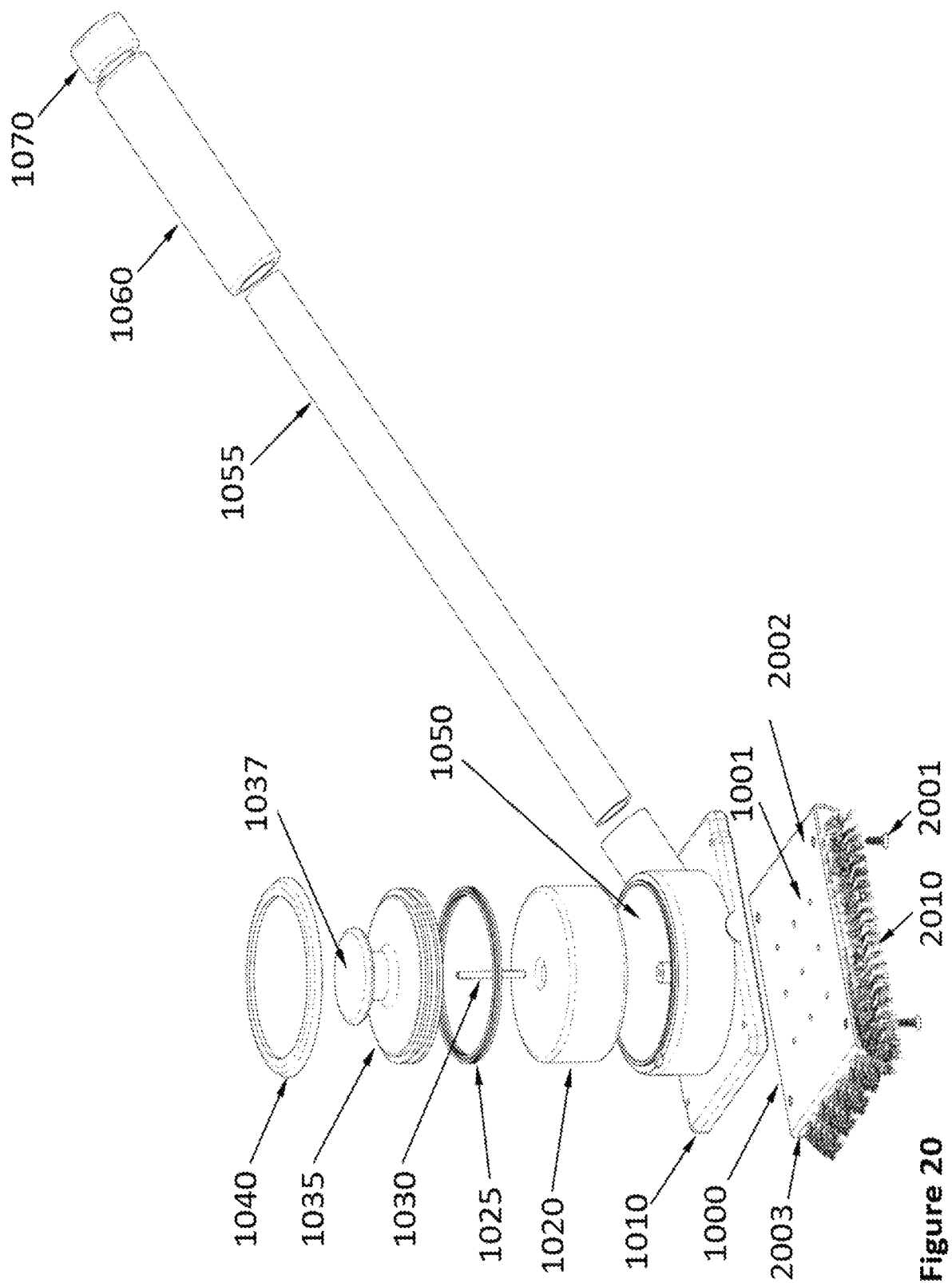
FIG. 20 is an exploded view of the disclosed cleaning tool from FIG. 18, showing the side view of the bristle brushes.
Figure 21:
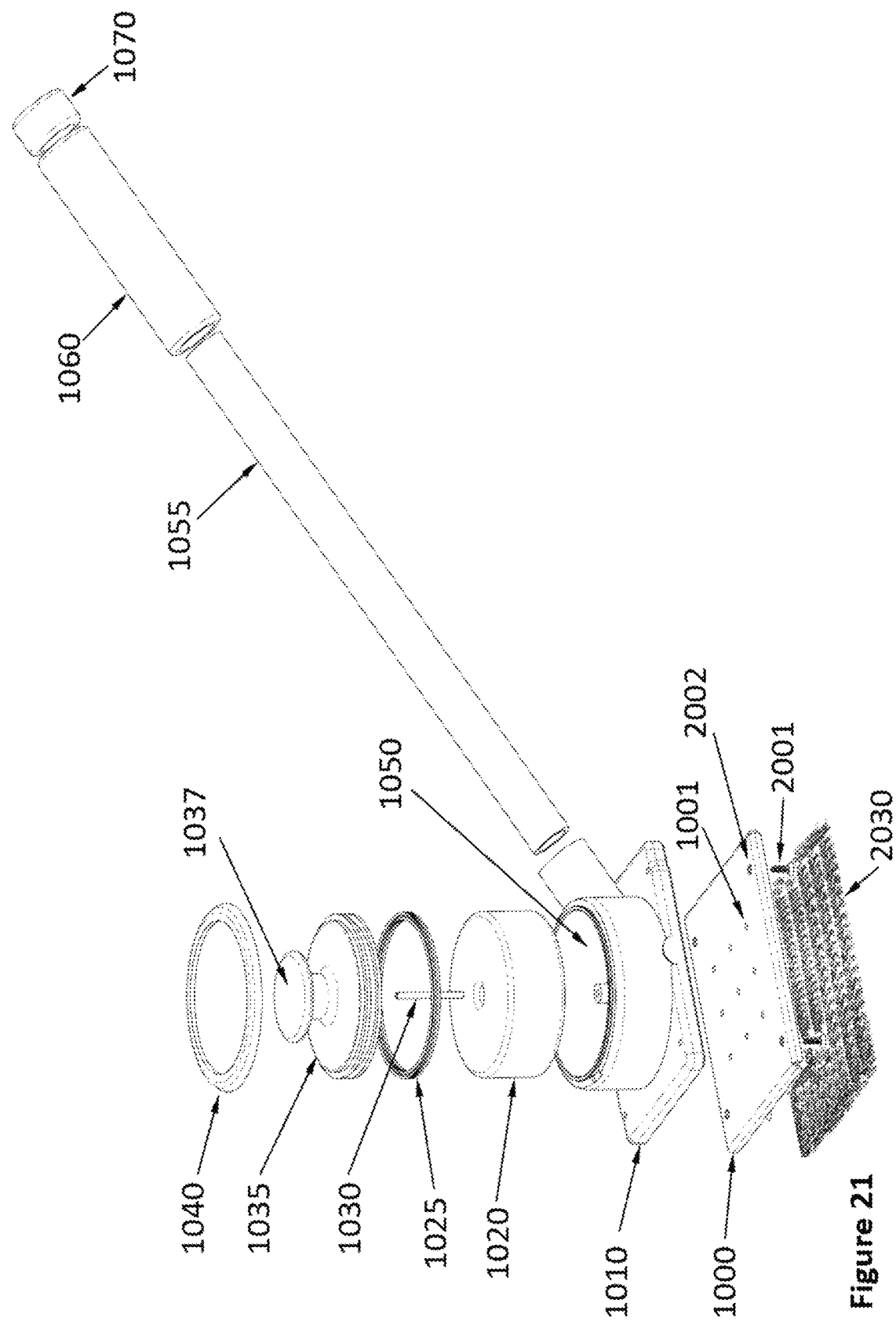
FIG. 21 is an exploded view of the disclosed cleaning tool from FIG. 18, showing the side view of the scrubber pad.
Figure 22:
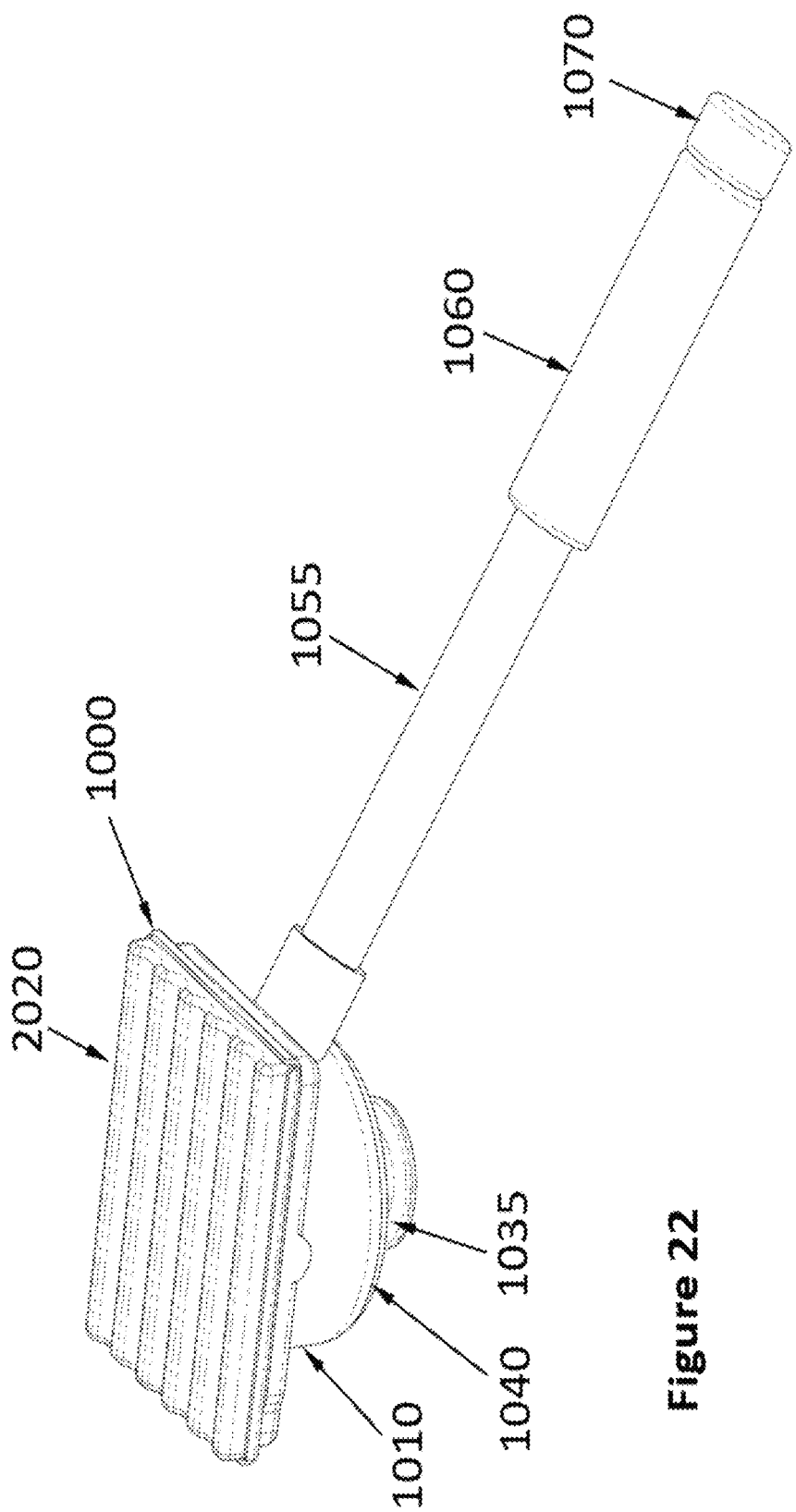
FIG. 22 is a bottom isometric view of the disclosed cleaning tool from FIG. 18, showing the bottom side view of the aluminum oxide sponge.

The cleaning tool 15 is crafted to interface with the user as illustrated in the flowcharts of FIG. 16 and FIG. 17. Before cleaning as part of the user interface 69 the user fills the reservoir 55 with an acidic solution or natural food grade cleaning acidic solution 61. The natural food grade cleaning acidic solution added to the reservoir can be lemon juice in alternative implantations. While scrubbing 62, the user places the brush on the grates 280 and moves the brush frontward and backwards in parallel to the grate rods 280. When the brush head 25 is pressed down from the knob 25 or tube-handle reservoir 50 during operation, the cleaning tool 15 flexes and compresses 68 the squeeze sponge 110, compression spring 160 to open the valve 130. The user 72 has the ability to regulate the flow of fluid within the orifices communicated between the brush head 25, reservoir 55, intermediate sponge layer 110 and valve 130 mechanism. Fluid is regulated 63 by the amount of force exerted downward on the knob 35 or tube handle reservoir 50 by the user. Upon activation, fluid is released 66 from the reservoir and disbursed downstream 67 onto the surface of the scrubbing brushes 175 and hot 64 surface of the grates, generating the steam 65 to effectively remove the residue. The scrubbing brushes 175 are designed and formed to scrub 62 and wrap around grooves for wrapping onto a top and sides of a corresponding bar of the cooking grate 280 in the direction intended. Conversely, the grill can be cleaned when the grill is not heated, but the cleaning method is not as effective as steam cleaning.

The disclosed invention relates to a cleaning tool used for cleaning barbecue grill grates and griddles as per the invention shown in FIGS. 18 to 31. Such illustrations are meant to show the innovative ways of cleaning barbecue grill grates and griddles and are not intended to be restrictive to the invention.

Referring to FIGS. 18 to 33, cleaning tool 155 comprises a cleaning-head hub 1010, a handle reservoir 1055, a reservoir 1050, a plunger plate 1035 disposed at a top of the reservoir, a plunger plate knob 1037 coupled to the cleaning-head hub 1010, a handle grip 1060; scrubbing components 1075 disposed beneath the mounting plate 1000; and a reservoir cap 1070. The reservoir cap 1070 is attached to the end of the handle reservoir 1055 and can have an optional pinhole opening through which air vents. The handle reservoir 1055 is cantilevered to extend to one side of the cleaning 155; has an elongate shape for grasping; attached to one end of the cleaning-head hub 1010 projecting the outer circumference of the orifice 1045; and contains an opening at the end of the handle through which fluid flows from the handle to the reservoir 1050. The handle grip 1060 can be inserted onto handle reservoir 1055 if the handle grip 1060 is made of foam, or the handle grip 1060 can be molded in place. The handle reservoir 1055 is attachable to the cleaning-head hub 1010 via mating the internally threaded ends of the handle reservoir 1055 and cleaning-head hub 1010 or press fitted in place; and is adapted to be filled with a liquid such as water or a natural food grade citrus acid cleanser.

Referring to FIGS. 18 to 21 and FIGS. 25 to 35, cleaning tools 155 and 156, respectively, comprises a squeeze sponge 1020 in various embodiments. The squeeze sponge 1020 is an open cell liquid absorptive material and is a compressible material disposed between the plunger plate 1035 and mounting plate 1000 in a configuration capable of squeezing the cleaning liquid from the open cell liquid absorptive material when force from above is applied on the plunger plate 1035. The mounting plate 1000 forms a liquid barrier layer comprising plurality of flow control openings 1001 to regulate the passage of fluid therethrough drawn from the reservoir; and is lodged between the bottom of the cleaning-head hub 1010 and above of the scrubbing components 1075.

Referring to FIGS. 18 to 33, the cleaning tool 155 is activated during operation by a user pushing down on the plunger plate knob 1037 which compresses the squeeze sponge 1020 and dispenses the fluid through the flow control openings 1001 of the mounting plate 1000. The reservoir 1050 and squeeze sponge 1020 provide a supply of fluid and wets the scrubbing components 1075 and grate bars 280 or griddle 2090 during use.

The plunger plate 1035 is lodged at the top of the reservoir which comprises a perimeter fluid seal 1025 fitted to mesh against interior sides of the reservoir to prevent the seal from slipping and leaking during operation. The base perimeter of the plunger plate 1035 embodies an annular grove around its circumference to secure the fluid seal 1025 in place. The plunger plate 1035 comprises an opening fitted to a stabilizer rod 1030 which includes first and second ends being laterally and centrally spaced between the interior volume of the reservoir 1050; the first end is coupled to the bottom base of plunger plate knob 1037; and the second end is coupled to the interior base of the cleaning hub 1010. The stabilizer rod 1030 is used to prevent the cleaning-head hub 1010 from wobbling side to side during use.

The plunger plate 1035 fitted with the fluid seal 1025 is constrained within the cleaning-head hub 1010 via a plastic plunger plate retainer ring 1040 which can be snapped, glued or welded in place during assembly. The plunger plate retainer ring 1040 is used to prevent the plunger plate 1035 from disengaging from the cleaning-head hub 1010 during operation; and can be detached from an indentation 1021 formed on the front end of the outer upper edge of the cleaning-head hub 1010.

The plunger plate knob 1037 is coupled to the plunger plate 1035 as one reciprocating plunger mechanism. The plunger plate 1035 is lodged above the squeeze sponge 1020 and reservoir 1050; and is used to regulate the flow of fluid within the orifice 1045 communicated between the reservoir 1050, squeeze sponge 1020 and flow control openings 1001. As fluid enters the reservoir 1050, fluid is retained by a squeeze sponge 1020 within the reservoir 1050. Fluid is regulated by the amount of force applied on the plunger plate 1035 which compresses the squeeze sponge 1020.

As the reciprocating plunger plate 1035 returns to its initial position, the squeeze sponge 1020 expands to its original structure drawing additional fluid form the reservoir 1050 for cleaning. The reservoir 1050 is replenished with fluid as needed for continuous use of the cleaning tool 155.

Referring to FIGS. 18 to 35, cleaning tools 155 and 156, respectively, can be assembled with removable scrubbing components 1075 made of an impermeable material capable of withstanding a temperature above 212 F (100 C). The scrubbing component 1075 include bristle brushes 2010, an aluminum oxide sponge 2020 and a scrubber pad 2030. The scrubbing component 1075 are anchored to the mounting plate 1000 assembly which is attached to the cleaning-head hub 1010 with threaded fasteners. A threaded fastener 2001 is inserted through the matting thread of the faster hole 2002 in each of the four corners of the mounting plate 1000.

The cleaning tools 155 and 156, respectively, further comprises a reservoir containing a squeeze sponge 1020 for holding a cleaning fluid, allowing fluid to enter the orifice 1045 of the cleaning-head hub 1010 wherein the squeeze sponge 1020 holds and transports the cleaning fluid from the reservoir to the scrubbing components 1075 for cleaning.

Referring to FIGS. 20, 24, 27, 28, 34 and 35, the cleaning tool 155 and cleaning tool 156 comprises a plurality of rows of bristle brushes 2010 with the rows arranged in parallel and spaced distances conforming to a cooking grate rod 2080. The bristle brushes 2010 include a heat tolerant wire capable of withstanding a temperature above 212 F (100 C). The bristle brushes 2010 consist of four stainless-steel spiraled wire bristles, woven around a twisted wire, arising in a 360 degrees configuration.

Staggered placement of bristle brushes 2010 allows cleaning with each stroke of the brush through added contact to the top and sides of the grate rods 2080. The spiraled wire bristle brushes 2010 are design to rotate around the grate rods 2080 and provides deep cleaning under hot flames.

Figure 24:
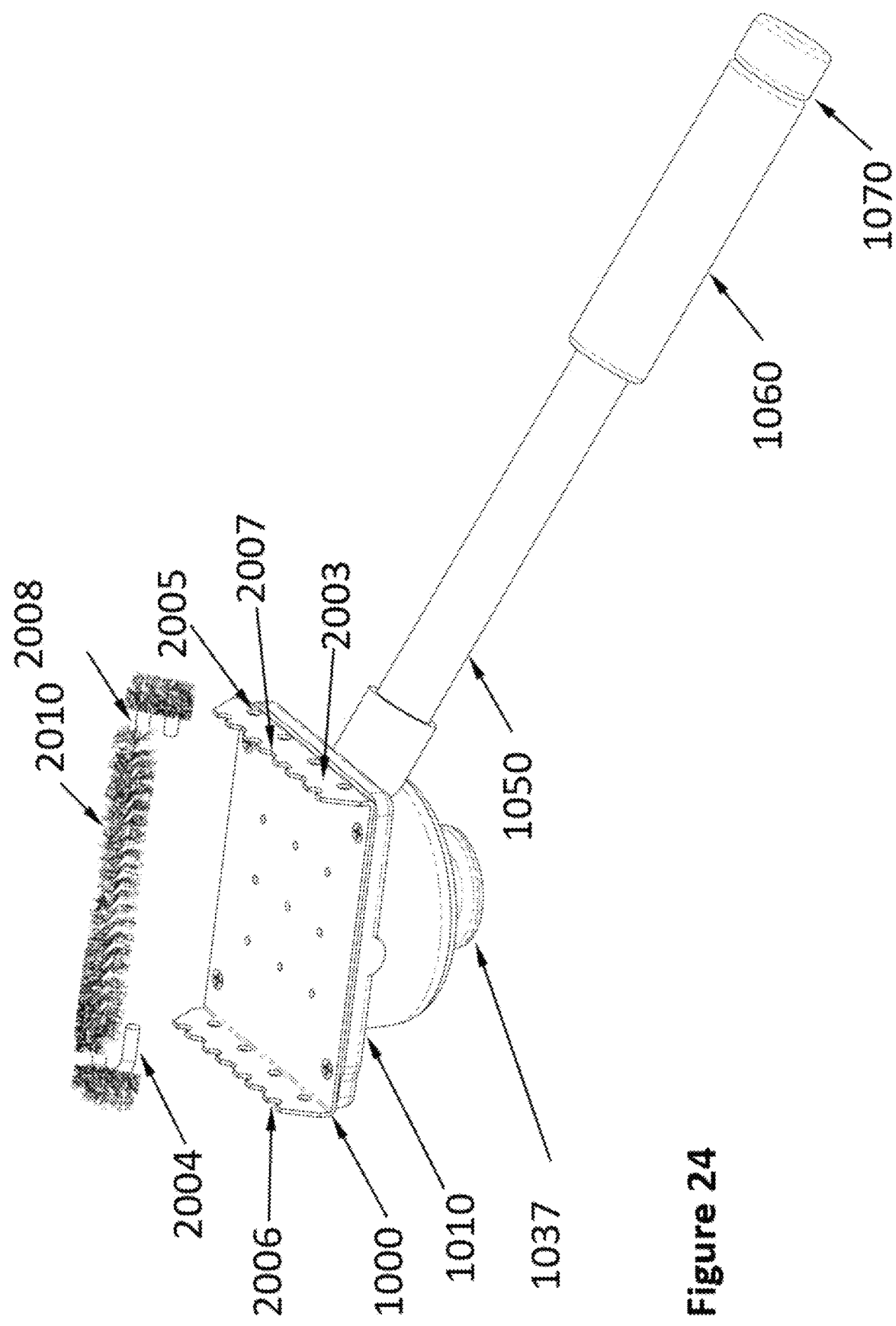
FIG. 24 is a bottom isometric view of the disclosed cleaning tool from FIG. 18, showing the flange and bristle brushes.
Figure 26:
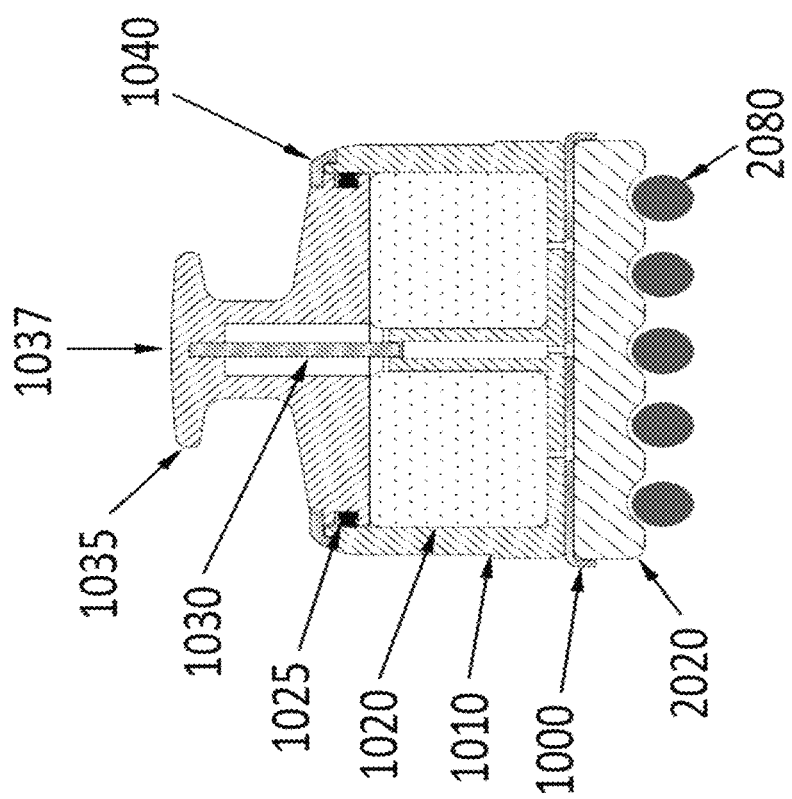
FIG. 26 is a front view of the of the disclosed cleaning tool from FIG. 18, showing the aluminum oxide sponge pressed against the grill grates.
Figure 25:
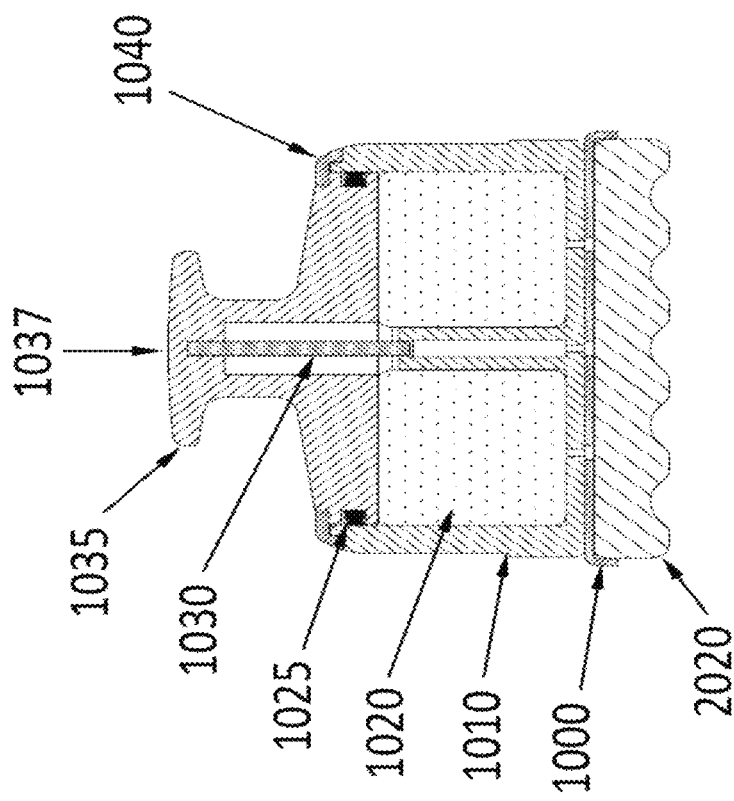
FIG. 25 is a front view of the disclosed cleaning tool from FIG. 18, showing the front view of the aluminum oxide sponge.
Figure 28:
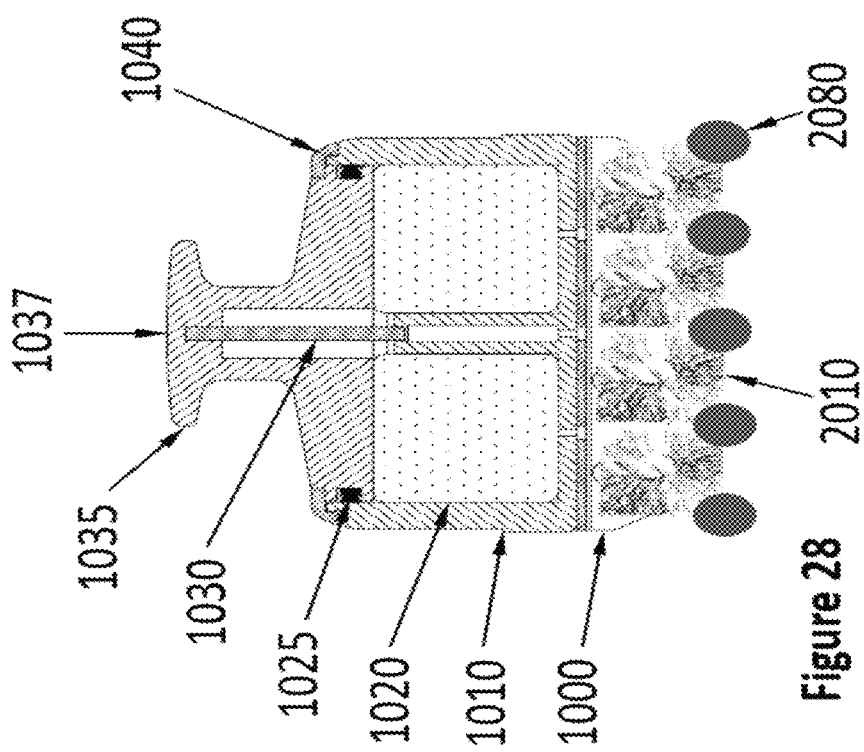
FIG. 28 is a front view of the disclosed cleaning tool from FIG. 18, showing the front view of the bristle brushes pressed against the grill grates.
Figure 27:
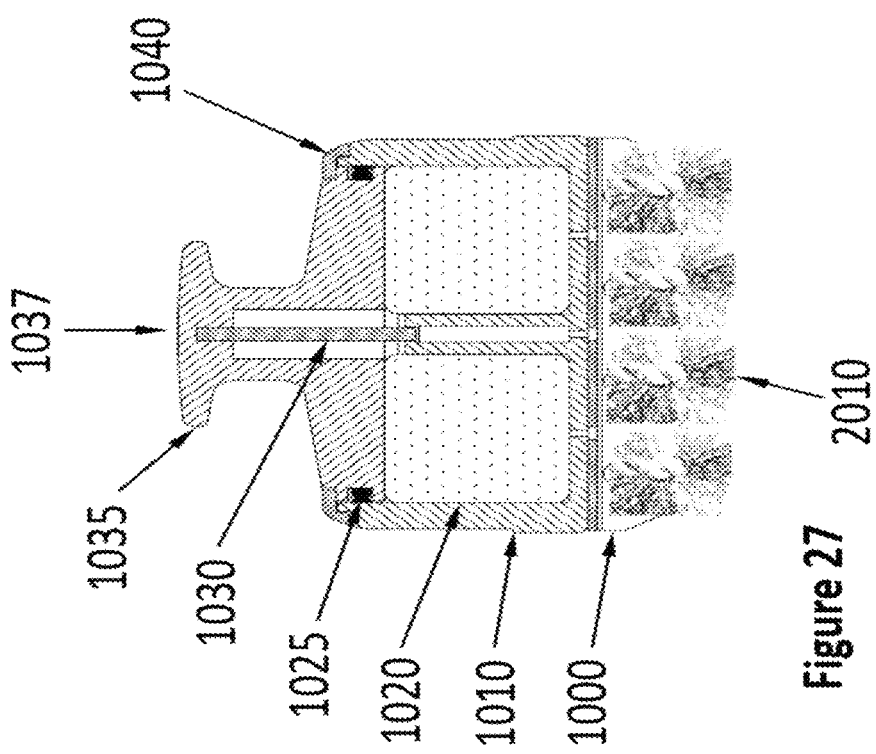
FIG. 27 is a front view of the disclosed cleaning tool from FIG. 18, showing the front view of the bristle brushes.
Figure 29:
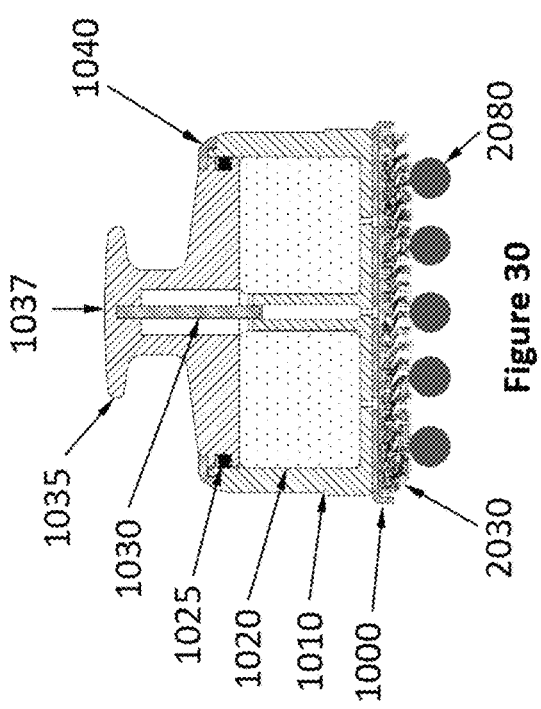
FIG. 29 is a front view of the disclosed cleaning tool from FIG. 18, showing the front view of the scrubber pad.

As illustrated in FIG. 24, the twisted wires or bristle brushes 2010 are anchored to the bottom enclosure of the mounting plate 1000 having a perpendicular bend forming longitudinal flanges 2003 projecting outwardly from opposite sides of the mounting plate 1000. Each flange 2003 has a row of evenly spaced concentric flange holes 2005 for gripping the bristle brushes 2010 which comprises a bare end wire 2004 and a bare portion 2008 of the end wire. Each flange 2003 is framed to the mounting plate 1000 structure and has a series of grooves 2007 on its edge. Each of the grooves 2007 join a respective bare portion 2008 of the end wire.

As further illustrated in FIG. 24, the bristle brushes 2010 are bent at one end to engage with the double-flanged 2003 vertical plate having grooved 2006 slots in its periphery between the two flanges 2003. The wire 2010 is bent at one end through a 180-degrees and "doubles back "on itself; and has of one bare-end wire 2004 which passes through the flange holes 2005. The springy nature of this insertion, causes the bare-end wire 2004 to rest against the bottom surface of the mounting plate 1000 and serves to grip the bristle brushes 2010. The grove 2006 at the lower end of the flange 2003 has a u-shape slot through which a portion of the bent end wire 2008 is fitted against the diameter and depth of the grove 2006. The slotted grove 2006 will grip the wire bristles 2010 evenly at any portion through its length.

Referring to FIGS. 19, 22, 25 and 26, the cleaning tool 155 includes an aluminum oxide sponge 2020 and is coated with aluminum oxide resin with bored pinholes to allow fluid to transport from the reservoir 1050 to scrubbing surface area during operation. The coated aluminum oxide resin is evenly distributed throughout the sponge and forms an abrasive scrubbing surface designed to be used for cleaning grills or flat top griddles. The aluminum oxide sponge 2020 comprises a closed cell sponge capable of withstanding a temperature above 212 F (100 C); liquid permeable channels for liquid permeability and a grooved sponge on a lower side with rows of grooves arranged in parallel and spaced distances conforming to grate rods 2080. The grooves in the grooved sponge of the aluminum oxide sponge 2020 comprise wrap around grooves for wrapping onto a top and sides of a corresponding bar of the cooking grate 2080. The grooved shape sponge is designed to promote effective rinsing as well as removal of remaining deposits on grate rods 2080 and can be used when the grill is cold or hot. The aluminum oxide sponge 2020 is bristle-free and safest way to rinse and clean the grate 2080, avoiding the danger of metal bristles that could fall out and contaminate the food.

Referring to FIGS. 21, 23 29, 30, 31 and 32, the cleaning tool 155 includes a scrubber pad 2030, consisting of a mesh material made from abrasive mineral particles distributed throughout the pad. The scrubber pad 2030 can be attached to the mounting plate 1000 via a removable adhesive to clean a flat surface griddle 2081. The scrubber pad 2030 include liquid permeable channels therein for liquid permeability and can be used wet or dry on grills or griddle at operating temperatures up to 450° F.

Figure 23:
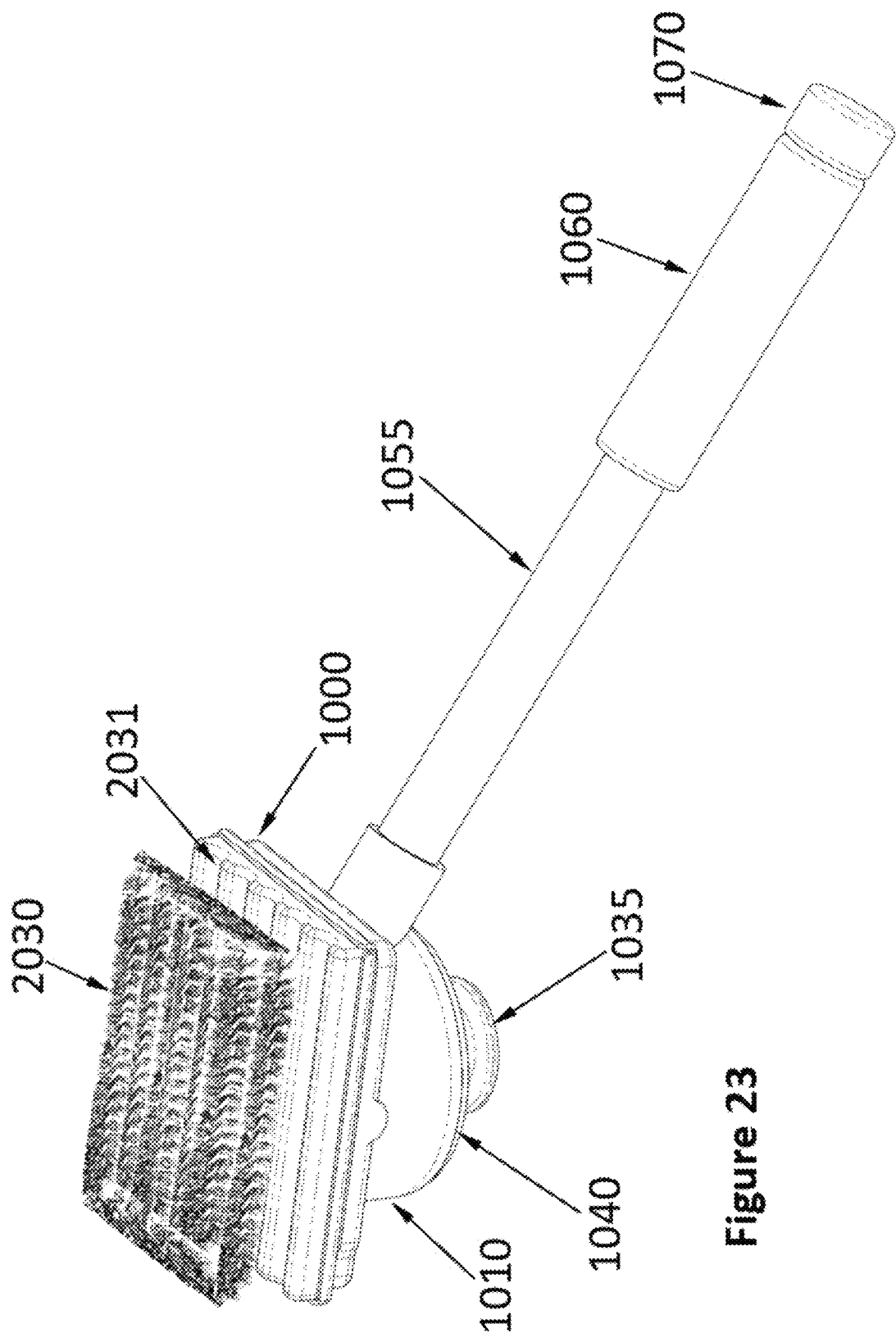
FIG. 23 is a bottom isometric view of the disclosed cleaning tool from FIG. 18, showing the bottom side view of the scrubber pad.
Figure 30:
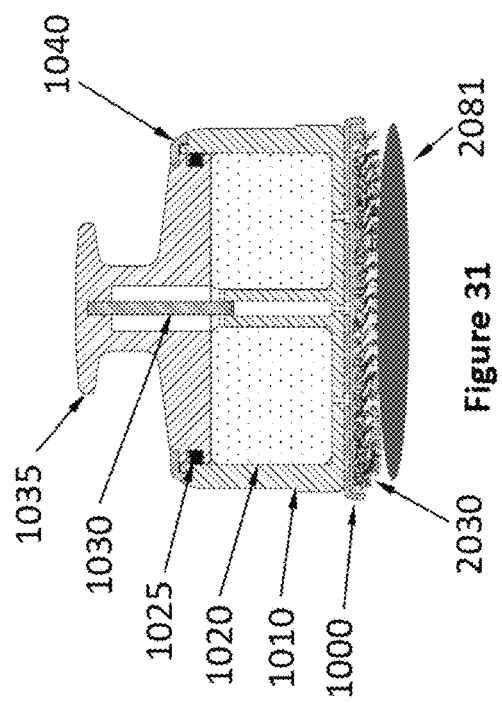
FIG. 30 is a front view of the disclosed cleaning tool from FIG. 18, showing the front view of the scrubber pad pressed against the grill grates.
Figure 31:
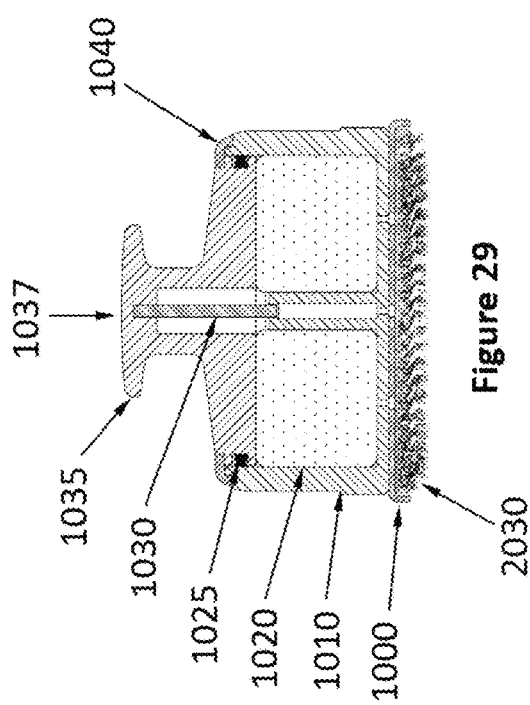
FIG. 31 is front side a cross-sectional view of the disclosed cleaning tool from FIG. 18, showing the front view of the scrubber pad pressed against a flat griddle.

Alternatively, the scrubber pad 2030 can be attached to a grooved insert plate 2031 as shown in FIG. 23 directly via a removable adhesive substrate. The scrubber pad 2030 is adhered to the bottom side of a grooved insert plate 2031 with rows of grooves arranged in parallel and spaced distances conforming to barbeque grate rods 2080, as illustrated in FIG. 30. The grooved insert plate 2031 is press fitted to the bottom enclosure of the mounting plate 1000; wherein each of the grooves in the grooved shape insert plate 2031 comprise wrap around grooves for wrapping onto a top and sides of a corresponding bar of the cooking grate 2080. The grooved shape scrubber pad 2030 is designed to promote effective rinsing as well as removal of remaining deposits on grate 2080.

Figure 32:
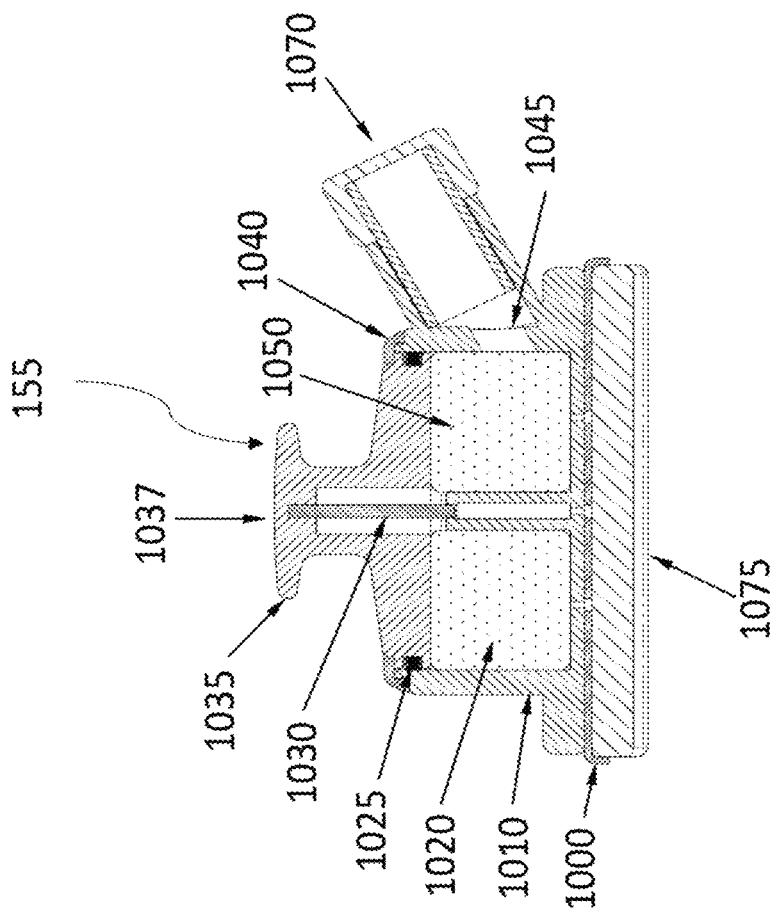
FIG. 32 is a side cross-sectional view of another embodiment of the disclosed cleaning tool from FIG. 18, showing the side view without a handle.
Figure 33:
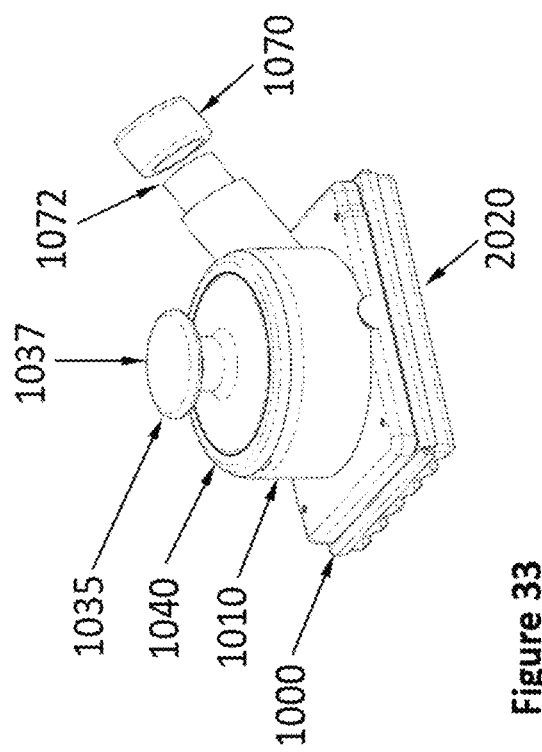
FIG. 33 is an isometric view of the disclosed cleaning tool from FIG. 32.

FIGS. 32 and 33 contain characteristics and construction of the embodiments as described FIGS. 18 to 31 above. Plus, in the embodiment of FIGS. 32 and 33, the cleaning tool is structured without a handle reservoir 1055 member that is cantilevered to extend to one side of the cleaning 155. At one end of the cleaning-head hub 1010 contains an opening 1072 where fluid enters the reservoir 1050. A reservoir cap 1070 is attached to the end of the opening 1072 projecting the outer circumference of the orifice 1045. The plunger plate knob 1037 allows the user to apply a downward force on the plunger plate 1035 to compress the squeeze sponge 1020 and to regulate the flow of fluid within the orifice 1045 communicated between the reservoir 1050, squeeze sponge 1020 and flow control openings 1001. Fluid is regulated by the amount of force applied on the plunger plate 1035 which compresses the squeeze sponge 1020. The cleaning tool is designed to be used on cool surfaces and provides interchangeable scrubbing components 1075 suited for grate cleaning for different types of surfaces. The application of this cleaning tool is not as effective as using the heating means to clean the grill.

As illustrated in FIGS. 32 and 33, the squeeze sponge 1020 is an open cell liquid absorptive material and is a compressible material disposed between the plunger plate 1035 and mounting plate 1000 in a configuration capable of squeezing the cleaning liquid from the open cell liquid absorptive material when force from above is applied on the plunger plate 1035. The mounting plate 1000 forms a liquid barrier layer comprising plurality of flow control openings 1001 to regulate the passage of fluid therethrough drawn from the reservoir; and is lodged between the bottom of the cleaning-head hub 1010 and above of the scrubbing components 1075 as in FIG. 32 or above the aluminum oxide sponge 2020 as in FIG. 33.

FIGS. 32 and 33, also illustrates the plunger plate 1035 is fitted with the fluid seal 1025 is constrained within the cleaning-head hub 1010 via a plastic plunger plate retainer ring 1040 which can be snapped, glued or welded in place during assembly. The plunger plate retainer ring 1040 is used to prevent the plunger plate 1035 from disengaging from the cleaning-head hub 1010 during operation; and can be detached from an indentation 1021 formed on the front end of the outer upper edge of the cleaning-head hub 1010.

In an alternative embodiment of FIGS. 32 and 33, the fluid can be directly applied to the squeeze sponge 1020 by omitting the orifice 1045, reservoir cap 1070 and opening 1072. The squeeze sponge 1020 acts as a reservoir. Therefore, a handle 1055 is not needed to act as a handle reservoir for holding the fluid. Nevertheless, the handle 1055 can be filled up with fluid to increase capacity and act as a secondary reservoir. This principle of selectively filling the handle reservoir 1055 can be applied as alternative embodiments to all of FIGS. 18 to 35.

Figure 34:
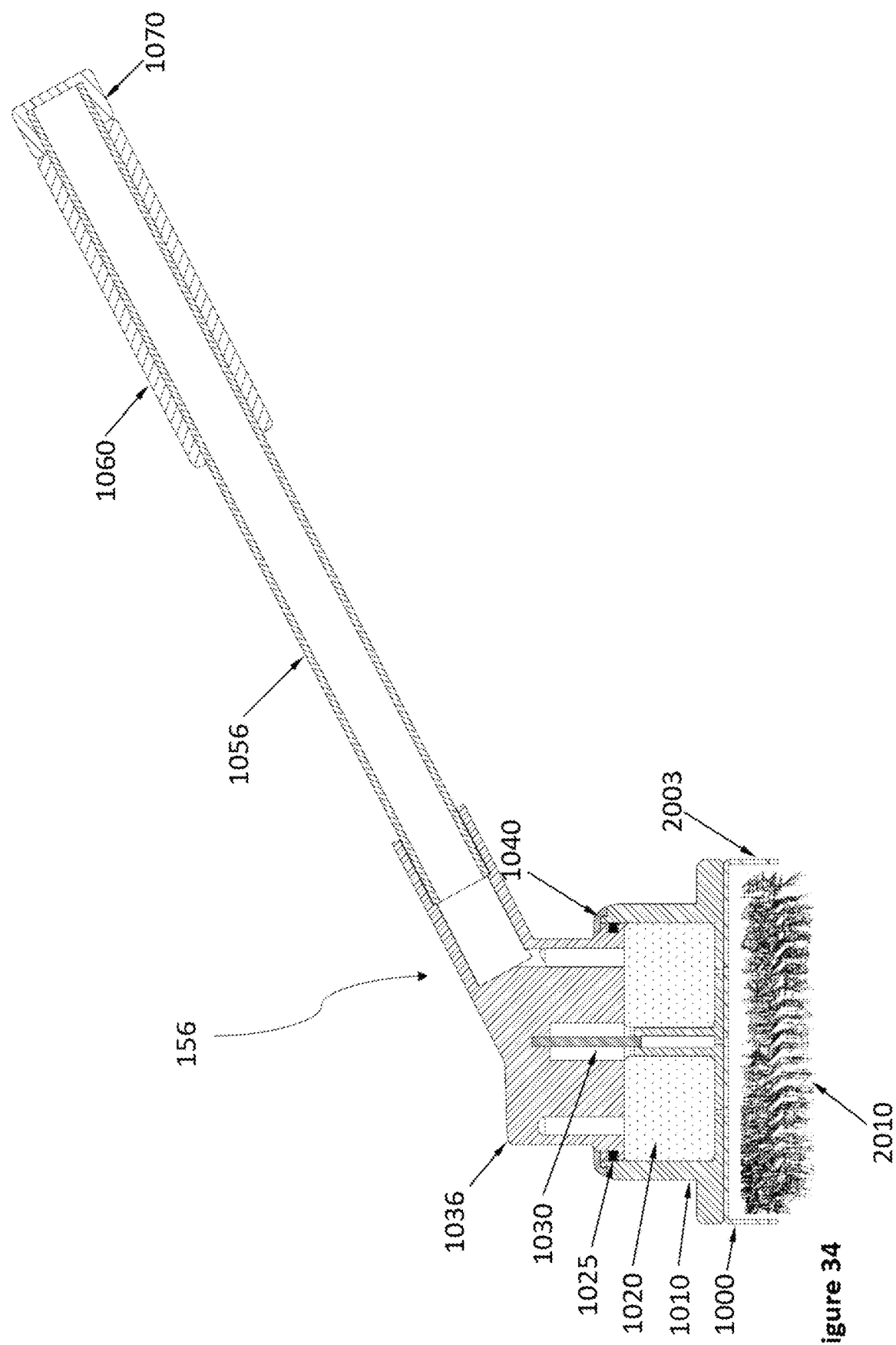
FIG. 34 is a side cross-sectional view of another embodiment of the disclosed cleaning tool from FIG. 18, showing the side view of a handle pivotally connected to a plunger plate.
Figure 35:
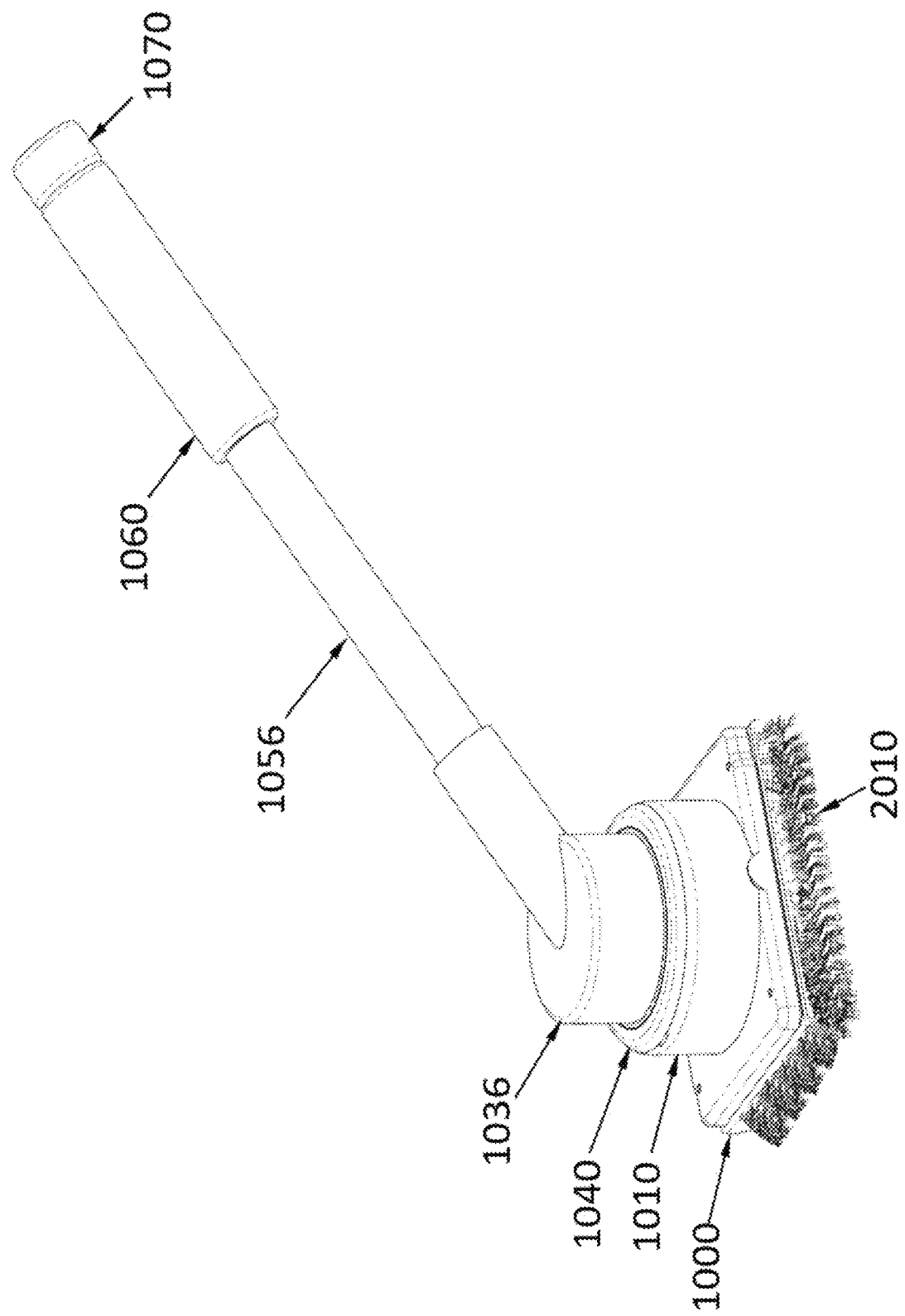
FIG. 35 is an isometric view of the disclosed cleaning tool from FIG. 34.

FIGS. 34 and 35 show an alternate embodiment of a cleaning tool 156, as referenced in FIGS. 18 to 31 above and uses the same numbers referenced to describe the features of the cleaning tool 155; and varies from the cleaning tool 155 in the construction of the handle-reservoir 1056 and the plunger plate 1036. The handle grip 1060 can be inserted onto handle-reservoir 1056 and a reservoir cap 1070 is attached to the end of the handle-reservoir 1056.

In this alternate embodiment, the end of the handle-reservoir 1056 member is pivotally connected to the plunger plate 1036 and functions as one reciprocating plunger mechanism. The handle-reservoir 1056 allows the user to grip the handle to apply a downward force on the plunger plate 1036 to compress the squeeze sponge 1020 and to regulate the flow of fluid within the orifice 1045 communicated between the reservoir 1050, squeeze sponge 1020 and flow control openings 1001. Fluid is regulated by the amount of force applied on the plunger plate 1036 which compresses the squeeze sponge 1020. The configuration and features of this embodiment are identical to the embodiments referenced above in FIGS. 18 to 21 other than the combined plunger plate 1035 and plunger plate knob 1037 assembly.

Referring to FIGS. 34 and 35, the plunger plate 1036 is lodged at the top of the cleaning tool 156 and includes an opening fitted to a stabilizer rod 1030 which includes first and second ends being laterally and centrally spaced between the interior volume of the reservoir 1050; the first end is coupled to the bottom base of plunger plate 1036; and the second end is coupled to the interior base of the cleaning hub 1010.

FIGS. 34 and 35 show the plunger plate 1036 fitted with the fluid seal 1025 is constrained within the cleaning-head hub 1010 via a plastic plunger plate retainer ring 1040 which can be snapped, glued or welded in place during assembly.

The cleaning tool 156 in FIGS. 34 and 35 consists of a plurality of rows of bristle brushes 2010 with the rows arranged in parallel and spaced distances conforming to a cooking grate rod 2080. As shown in FIG. 24 the bristle brushes 2010 is bent at one end to engage with a double-flanged 2003 vertical plate having grooved 2006 slots in its periphery between the two flanges 2003. The wire 2010 is bent at one end through a 180-degrees and "doubles back "on itself; and consists of one bare-end wire 2004 which passes through the flange holes 2005. The springy nature of this insertion, causes the bare-end wire 2004 to rest against the bottom surface of the mounting plate 1000 and serves to grip the bristle brushes 2010.

FIGS. 34 and 35 further illustrates the mounting plate 1000 as it forms a liquid barrier layer including plurality of flow control openings 1001 to regulate the passage of fluid therethrough drawn from the reservoir; and is lodged between the bottom of the cleaning-head hub 1010 and above of the bristle brushes 2010.

FIGS. 18 to 35 illustrate a need for such a cleaning tool to be used to regulate the fluid to effectively use the heat from the grill to generate steam for cleaning while grilling. The cleaning tools 155 and 156, respectively, can use the heat from the hot cooking surface to generate steam from the fluid drawn from the reservoir during use and easily remove the residue and grease from the on top and side surfaces of the grate channels or top surfaces of a griddle.

Any letter designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

The invention claimed is:

1. A cleaning tool, comprising:
   an open cell liquid absorptive material;
   a plunger plate disposed above the open cell liquid absorptive material;
   a liquid permeable material disposed below the open cell liquid absorptive material on an outside surface of the tool;
   a liquid barrier layer comprising plurality of flow control openings and disposed between the open cell liquid absorptive material and the liquid permeable material;
   a handle coupled to the plunger plate; and
   a reservoir containing the open cell liquid absorptive material for holding a cleaning fluid, the liquid barrier layer disposed at a bottom of the reservoir, and the plunger plate disposed at a top of the reservoir, wherein an interior of the reservoir comprises a vertical retainer rod and wherein the plunger plate comprises an opening fitted to the retainer rod.

2. A cleaning tool according to claim 1, wherein the handle comprises a knob above the plunger plate.

3. A cleaning tool according to claim 1, wherein the handle comprises an elongated member cantilevered to extend to one side of the cleaning tool.

4. A cleaning tool according to claim 1, wherein the plunger plate comprises a perimeter seal fitted to press and seal against interior sides of the reservoir.

5. A cleaning tool according to claim 1, further comprising an elongated member connected to the reservoir and cantilevered to extend to one side of the cleaning tool.

6. A cleaning tool according to claim 1, wherein the liquid permeable material disposed below the open cell liquid absorptive material comprises a heat tolerant liquid permeable material capable of withstanding a temperature above 212 F (100 C).

7. A cleaning tool according to claim 6, wherein the heat tolerant liquid permeable material comprises a heat tolerant liquid permeable sponge.

8. A cleaning tool according to claim 7, wherein the heat tolerant liquid permeable sponge comprises a closed cell sponge with liquid permeable channels therein for liquid permeability.

9. A cleaning tool according to claim 7, wherein the sponge comprises a grooved sponge on a lower side with rows of wrap around grooves for wrapping onto a top and sides of a corresponding bar of a cooking grate.

10. A cleaning tool according to claim 7, wherein the sponge comprises an aluminum oxide coated sponge.

11. A cleaning tool according to claim 7, wherein the sponge comprises a silicone sponge.

12. A cleaning tool according to claim 6, wherein the heat tolerant liquid permeable material comprises a heat tolerant brush.

13. A cleaning tool according to claim 12, wherein the heat tolerant brush comprises a plurality of rows of wire brushes with the rows arranged in parallel and spaced distances conforming to a cooking grate.

14. A cleaning tool according to claim 1,
   wherein the liquid permeable material is a plane;
   wherein the cleaning tool further comprises a pair of opposing flanges each perpendicular to the plane of the liquid permeable material and comprising a row of evenly spaced flange holes; and
   wherein the liquid permeable material comprises a plurality of twisted wire brushes, wherein ends of each of the twisted wire brushes fit into a corresponding one of the evenly spaced flange holes to form rows of brushes.

15. A cleaning tool according to claim 14,
   wherein the pair of opposing flanges each further comprise a series of grooves on a flange edge corresponding to each evenly spaced flange hole; and
   wherein the ends of each of the plurality of twisted wire brushes are bent 180-degrees at each end and rest in a corresponding one of the grooves along an end portion near each end of the twisted wire brushes before the bend.

16. A cleaning tool according to claim 1, wherein the open cell liquid absorptive material is a compressible material disposed beneath the plunger plate in a configuration capable of squeezing the cleaning fluid from the open cell liquid absorptive material when force from above is applied on the plunger plate.

17. A cleaning tool according to claim 1, wherein the open cell liquid absorptive material comprises an open cell sponge.

18. A cleaning tool according to claim 1,
   wherein the liquid permeable material disposed below the open cell liquid absorptive material comprises a heat tolerant liquid permeable material; and
   wherein the heat tolerant liquid permeable material comprise a scrubber pad.

19. A cleaning tool according to claim 18, wherein the scrubber pad consists of a mesh material.

20. A cleaning tool according to claim 19, wherein the mesh material is made from abrasive mineral particles distributed throughout the scrubber pad.

\* \* \* \* \*